United States Patent [19]

Ogatsu et al.

[11] Patent Number: 5,719,956
[45] Date of Patent: Feb. 17, 1998

[54] IMAGE PROCESSING APPARATUS WITH SEPARATE COLOR CONVERSION FOR CMY SIGNALS AND K SIGNAL

[75] Inventors: Hitoshi Ogatsu; Shinji Kita, both of Ebina, Japan

[73] Assignee: Fuji Xerox Co., Ltd., Tokyo, Japan

[21] Appl. No.: 542,259

[22] Filed: Oct. 12, 1995

[30] Foreign Application Priority Data

Oct. 17, 1994 [JP] Japan .................................. 6-277029

[51] Int. Cl.$^6$ .................................................. G03F 3/08
[52] U.S. Cl. .................... 382/167; 358/518; 358/523; 358/529
[58] Field of Search .............................. 358/523, 515, 358/529, 504, 406, 518; 348/675; 382/167; 395/109

[56] References Cited

U.S. PATENT DOCUMENTS 4,992,862  2/1991  Gabov ........................ 358/518
5,146,328  9/1992  Yamasaki et al. ........... 348/675
5,296,935  3/1994  Bresley ........................ 358/406

FOREIGN PATENT DOCUMENTS

B2-58-16180  3/1983  Japan .
A-2-87192    3/1990  Japan .

Primary Examiner—Edward L. Coles, Sr.
Assistant Examiner—Fan Lee
Attorney, Agent, or Firm—Oliff & Berridge

[57] ABSTRACT

The CiMiYi signals of input CiMiYiKi signals are converted into CoMoYo signals of CoMoYoKo signals by using three-dimensional LUT color converting devices. The Ki signal of the input CiMiYiKi signals is subjected to gradation conversion to obtain the Ko signal of the CoMoYoKo signals by using a one-dimensional LUT.

8 Claims, 13 Drawing Sheets

FIG. 14
PRIOR ART

| APPLICATION | FUNCTION | COLOR SPACE | COLOR MATCHING |
|---|---|---|---|
| Illustrator 3.2 | ILLUSTRATION | C M Y K | P A N T O N E<br>T O Y O<br>D I C |
| FreeHand 3.1 | ILLUSTRATION | R G B<br>H S L<br>C M Y<br>C M Y K | P A N T O N E<br>T O Y O<br>D I C |
| PhotoShop 2.01 | IMAGE EDITING | G r a y<br>R G B<br>C M Y K<br>H S L<br>H S B | P A N T O N E<br>T R U E M A T C H<br>F O C O L T O N E<br>D I C<br>T O Y O |
| PageMaker 3.5J | PAGE LAYOUT | R G B<br>H S L<br>C M Y K | P A N T O N E |

IMAGE PROCESSING APPARATUS WITH SEPARATE COLOR CONVERSION FOR CMY SIGNALS AND K SIGNAL

BACKGROUND OF THE INVENTION

1. Field of the Invention

The present invention relates to an image processing apparatus for converting particular CMYK (cyan, magenta, yellow, and black) signals into other CMYK signals.

2. Description of the Related Art

In a color copying machine and a color printer, color conversion processing is generally carried out by limiting or assuming an input color so as to match the color reproduction characteristics of an image output device (image recording device) being used.

In a color copying machine, for instance, particular RGB (red, green, and blue) signals are obtained as input color signals when a color image on an original is optically read by an image reading device, i.e., an input unit of the color copying machine. Meanwhile, an image output device which is an output unit of the color copying machine generally uses particular colorants, C, M, Y, and K, and has particular color reproduction characteristics. Hence, in the image processing apparatus, the RGB signals are converted into CMYK signals in such a manner that the color of a print matches the color of the original.

In a color printer, it is assumed that particular color signals are inputted from an external computer or the like, and that NTSC RGB signals which are generally used in television are inputted to the color printer. Meanwhile, an image output device (printer unit) which is an output unit of the color printer generally uses particular colorants, C, M, Y, and K, and has particular color reproduction characteristics. Hence, in the image processing apparatus (image processing unit), input color signals such as the NTSC RGB signals are converted into the CMYK signals in such a manner that the color of a print matches the color displayed on an external display.

Recently, color-image input/output media have become diversified, and color image information in one color-image input/output medium has come to be converted into that for another through a network. Therefore, color signals have also come to be diversified, and, among pieces of application software for editing color image information, there have appeared those which are provided with specifications which permit the handling of many color signals.

FIG. 14 shows color representation specifications of typical pieces of the aforementioned application software. As color spaces, it is possible to use (1) the RGB space, (2) HSL and HSB spaces defined by a modification calculation of the RGB space, and (3) the CMYK space which is the recorded color itself. In general, however, the CMYK signals are used in the form of use in which a printed output is used as a final output, and the CMYK signals are transmitted to a printing-plate scanner.

Even if the color space may be the same, actual color signals can be different. For instance, even in the case of the RGB signals, the NTSC RGB signals differ from RGB signals obtained by a general color scanner. Further, even among a plurality of kinds of color scanners, differences arise in the output color signals due to the difference in the respective spectral responses and the like. In the CMYK space, if the colorant sets differ, the printed color differs even if the same CMYK signals are used.

That is, apart from the difference in the color space, the index as to whether or not the color signal is device-dependent exits as an index of the color signal. Device-independent signals are signals which can be converted into colorimetric color coordinate spaces (XYZ, Lab, Luv, etc. recommended by CIE (Commission Internationale de l'Eclairage)) by using known defining formulae, and the NTSC RGB signals fall under this category. On the other hand, device-dependent signals are signals which are set by assuming various characteristics of particular devices, and CMYK signals and RGB signals which are obtained by color scanners fall under this category.

In a case where device-dependent signals are processed by a device different from an assumed one, the relationship of correspondence between the device-dependent signals and the device-independent signals must be described in some form. This relationship of correspondence is the color matching shown in FIG. 14, and in application software for illustration "Illustrator 3.2," for example, color coordinate values with respect to a plurality of CMYK signals are shown in correspondence with the types of printing ink and the like.

In order to allow the CMYK signals thus generated by assuming a particular image output device to be outputted by another image output device different from the assumption, it is conceivable to use the matrix operation which has long been used for the color conversion in order to convert the CMYK signals into those for other image output devices on the basis of the aforementioned relationship of correspondence.

However, as is well known, the color conversion based on the matrix operation has the drawback that the color reproducibility is not sufficient. For instance, in the so-called digital color proofing in which CMYK signals generated by assuming the printing use are transmitted to a particular digital printer, and are printed out, and the finish of the color in printing is checked in printing, it is particularly required to simulate with high accuracy the finish of the color in printing. In the color conversion based on the matrix operation, however, it is utterly impossible to satisfy such a requirement.

Accordingly, it is conceivable to use the color conversion based on the reference to a conversion table, such as the one shown in Japanese Examined Patent Publication No. Sho. 58-16180, in the case of converting particular CMYK signals into other CMYK signals, as described above.

FIG. 15 illustrates a conceivable example of the image processing apparatus for converting particular CMYK signals into other CMYK signals by referring to such a conversion table. To distinguish the CMYK signals prior to conversion from the CMYK signals subsequent to conversion, the CMYK signals prior to conversion will be referred to as CiMiYiKi signals, and the CMYK signals subsequent to conversion as CoMoYoKo signals.

In this example, the color conversion based on reference to a three-dimensional conversion table used for converting Lab signals (although the Lab signals should be written as L*a*b* signals, they are written as the Lab signals for convenience sake) is replaced by the color conversion based on reference to a four-dimensional conversion table. CiMiYiKi signals, each consisting of 8-bit data, are commonly inputted to four-dimensional LUT (lookup table) color converting devices 1 to 4, in order to obtain CoMoYoKo signals, each consisting of 8-bit data, from the four-dimensional LUT color converting devices 1 to 4.

In this case, if conversion tables of the four-dimensional LUT color converting devices 1 to 4 are given values corresponding to the values of the CiMiYiKi values on a one-to-one correspondence basis, and the values themselves in the conversion tables are fetched as the CoMoYoKo signals, the table size of the four-dimensional LUT color converting devices 1 to 4 becomes enormously large.

In addition, if the conversion tables of the four-dimensional LUT color converting devices 1 to 4 are respectively given values corresponding to divided areas of the values of the CiMiYiKi signals, and the values themselves in the conversion tables are fetched as the CoMoYoKo signals, the conversion accuracy declines remarkably.

Therefore, it is practical to provide an arrangement in which an interpolation method in the case of the three-dimensional input address space such as the one shown in the aforementioned publication No. Sho. 58-16180 is extended to a four-dimensional input address space as suggested in Japanese Unexamined Patent Publication No. Hei. 2-87192.

However, the image processing apparatus shown in FIG. 15, which is conceivable as the one for converting particular CMYK signals into other CMYK signals, requires four four-dimensional LUT color converting devices. Hence, even if an interpolation configuration is provided, there is a drawback in that the table size becomes remarkably large.

That is, in a case where, for example, the Lab signals are converted into the CMYK signals, it suffices if four three-dimensional LUT color converting devices are provided. In this case, in a case where, as the interpolation configuration, the conversion table of each three-dimensional LUT color converting device is divided into 16 parts, and one piece of lattice-point data is assumed to be 8 bits, the table size of one three-dimensional LUT color converting device becomes 17×17×17∝4.8 Kbytes, and the total table size of the four three-dimensional LUT color converting devices amounts to a reasonably large size of about 19.2 Kbytes.

In contrast, in the image processing apparatus shown in FIG. 15, if, as the interpolation configuration, each of the conversion tables of the four-dimensional LUT color converting devices 1 to 4 is divided into 16 parts, and one piece of the lattice-point data is assumed to be 8 bits, the table size of one four-dimensional LUT color converting device becomes about 4.8 Kbytes×17, i.e., about 82 Kbytes, and the total table size of the four four-dimensional LUT color converting devices 1 to 4 amounts to a very large size of about 326 Kbytes.

Moreover, in the image processing apparatus shown in FIG. 15, since the input address space is four-dimensional as described above, there is a drawback in that the interpolation calculating units of the respective four four-dimensional LUT color converting devices 1 to 4 become complex in an exponential manner.

SUMMARY OF THE INVENTION

Accordingly, an object of the present invention is to make it possible to convert particular CMYK signals into other CMYK signals with a simple configuration equivalent to that in a case which is adapted for three inputs in terms of the table size and the interpolation configuration of a color converting means of a conversion-table referencing type, and with high accuracy equivalent to that in a case which is adapted for four inputs in terms of the conversion accuracy.

According to a first aspect of the invention (correspondence is made with reference numerals used in the embodiment of FIG. 1 or 6 that will be described later), there is provided an image processing apparatus for converting CiMiYiKi signals which are particular CMYK signals into CoMoYoKo signals which are other CMYK signals, comprising CMY-signal converting means (11) for converting the CiMiYi signals into the CoMoYo signals by using a color converting device (12 to 14, or 18) of a three-dimensional-conversion-table referencing type; and K-signal converting means (21) for subjecting the Ki signal to gradation conversion to obtain the Ko signal.

According to a second aspect of the invention (correspondence is made with reference numerals used in the embodiment of FIG. 5 that will be described later), there is provided an image processing apparatus for converting CiMiYiKi signals which are particular CMYK signals into CoMoYoKo signals which are other CMYK signals, comprising CMY-signal converting means (11) for converting the CiMiYi signals into the CoMoYo signals by using a color converting device (12 to 14, or 18) of a three-dimensional-conversion-table referencing type; and K-signal non-converting output means (22) for outputting the Ki signal as the Ko signal without converting the Ki signal.

According to a third aspect of the invention (correspondence is made with reference numerals used in the embodiment of FIG. 6 that will be described later), in the image processing apparatus according to the first or second aspect of the invention, the CMY-signal converting means (11) includes only one color converting device (18) of a three-dimensional-conversion-table referencing type, a conversion table of the color converting device (18) of a three-dimensional-conversion-table referencing type is changed in a frame-sequential manner, and the CoMoYo signals are obtained from the color converting device (18) of a three-dimensional-conversion-table referencing type in a frame-sequential manner.

According to a fourth aspect of the invention (correspondence is made with reference numerals used in the embodiment of FIGS. 8 and 9 that will be described later), there is provided an image processing apparatus for converting plural kinds of input color signals, each kind having four or three signals, including CiMiYiKi signals which are particular CMYK signals, into CoMoYoKo signals which are other CMYK signals, comprising input-color-signal identifying means (320) for identifying a kind of actually inputted color signals on the basis of information added to the actually inputted color signals; signal converting means (19) for converting three signals of the actually inputted color signals, excluding the Ki signal when the actually inputted color signals are the CiMiYiKi signals, into the CoMoYo signals or CoMoYoKo signals by using a color converting device of a three-dimensional-conversion-table referencing type; signal output means (64, 23) for subjecting one of the actually inputted color signals, to gradation conversion to obtain the Ko signal, or for outputting the one of the input color signals as the Ko signal without converting the one of the input color signals, the one of the actually inputted color signals being the Ki signal when the actually inputted color signals are the CiMiYiKi signals; and selecting means (80) for selecting, on the basis of the kind of the actually inputted color signals identified by the input-color-signal identifying means (320), both of the signal converting means (19) and the signal output means (64, 23) when the actually inputted signals are the CiMiYiKi signals, and only the signal converting means (19) when the actually inputted signals are not the CiMiYiKi signals.

According to a fifth aspect of the invention (correspondence is made with reference numerals used in the embodiment of FIGS. 8 and 9 or 12 that will be described later), there is provided an image processing apparatus for converting CiMiYiKi signals which are CMYK signals that are generated by color signal generating means (212, 222)

connected to a network (100), into CoMoYoKo signals which are other CMYK signals, comprising color signal input means (310, 330) for receiving the CiMiYiKi signals from the color signal generating means (212, 222); conversion information recognizing means (320) for recognizing information to be used in converting the CiMiYiKi signals with mapping to a physical color space; CMY-signal converting means (19) for converting the CiMiYi signals that are supplied from the color signal input means (310, 330) into the CoMoYo signals by using a color converting device of a three-dimensional-conversion-table referencing type; conversion table setting means (90) for setting a conversion table of the CMY-signal converting means (19) on the basis of a recognition result of the conversion information recognizing means (320); and signal output Means (64, 23) for subjecting the Ki signal that is supplied from the color signal input means (310, 330) to gradation conversion to obtain the Ko signal, or outputting the Ki signal as the Ko signal without converting the Ki signal.

According to a sixth aspect of the invention (correspondence is made with reference numerals used in the embodiment of FIGS. 8 and 9 or 12 that will be described later), there is provided an image processing apparatus for converting CiMiYiKi signals which are CMYK signals stored in an external storage medium (243), into CoMoYoKo signals which are other CMYK signals, comprising color signal input means (310, 330) for receiving the CiMiYiKi signals from the external storage medium (243); conversion information recognizing means (320) for recognizing information to be used in converting the CiMiYiKi signals with mapping to a physical color space; CMY-signal converting means (19) for converting the CiMiYi signals that are supplied from the color signal input means (310, 330) into the CoMoYo signals by using a color converting device of a three-dimensional-conversion-table referencing type; conversion-table setting means (90) for setting a conversion table of the CMY-signal converting means (19) on the basis of a recognition of the conversion information recognizing means (320); and signal output means (64, 23) for subjecting the Ki signal that is supplied from the color signal input means (310, 330) to gradation conversion to obtain the Ko signal, or outputting the Ki signal as the Ko signal without converting the Ki signal.

In normal printing, a gray component replacement (GCR) method which is called "skeleton black method" and uses a black signal (K signal) only in relatively high-density portions is generally adopted. A gray component replacement method similar to the above is also carried out in the standard color image data (SCID) which is a standard digital chart in printing in Japan and the United States.

In general, gray component replacement can be expressed by the following Formulae (1) to (4) by using C', M', and Y' signals at the time of reproducing a particular color by the three colors, cyan, magenta, and yellow:

$$K = \min\{C', M', Y'\} \times \alpha \quad (1)$$

$$C = C' - K \cdot \beta \quad (2)$$

$$M = M' - K \cdot \beta \quad (3)$$

$$Y = Y' - K \cdot \beta \quad (4)$$

Here, the coefficient $\alpha$ is generally limited to ½ or less, while the coefficient $\beta$ is set to 1, for example.

In this case, a reproduced color P{C', M', Y'} using three colors, cyan, magenta, and yellow, is substantially equivalent to a reproduced color P{C, M, Y, K} using four colors, cyan, magenta, yellow, and black, so that $$P\{C', M', Y'\} \propto P\{C, M, Y, K\} \quad (5)$$

Accordingly, if the gray component replacement method is used as a premise, the following formula holds from Formulae (1) to (5):

$$P\{C, M, Y, K\} \propto P\{C + K \cdot \beta, M + K \cdot \beta, Y + K \cdot \beta, 0\} \quad (6)$$

Therefore, in the case where CiMiYiKi signals which are certain CMYK signals are converted into CoMoYoKo signals which are other CMYK signals, if it is assumed that Formulae (1) to (5) hold with respect to both the CiMiYiKi signals and the CoMoYoKo signals, the conversion from the CiMiYiKi signals into the CoMoYoKo signals becomes possible by the steps shown in the following Formula (7):

$$\{Ci, Mi, Yi, Ki\} \rightarrow \{Ci + Ki \cdot \beta, Mi + Ki \cdot \beta, Yi + Ki \cdot \beta\} \rightarrow \Lambda\{Ci + Ki \cdot \beta, Mi + Ki \cdot \beta, Yi + Ki \cdot \beta\} \rightarrow \{Co', Mo', Yo'\} \rightarrow \{Co, Mo, Yo, Ko\} \quad (7)$$

Namely, in the general gray component replacement method which is called "skeleton black method" and used for printing and the like, and for which Formulae (1) to (5) hold, the conversion of the CiMiYiKi signals which are particular CMYK signals into CoMoYoKo signals which are other CMYK signals can be realized by the conversion from the CiMiYi signals into the CoMoYo signals by using an input/output function $\Lambda$ with respect to the trichromatic representation and by the conversion from the Ki signal into the Ko signal.

Then, the conversion from the CiMiYi signals into the CoMoYo signals by using an input/output function $\Lambda$ with respect to the trichromatic representation can be realized by a color converting device of a three-dimensional-conversion-table referencing type. Meanwhile, the conversion from the Ki signal into the Ko signal can be realized by the one-dimensional gradation conversion. Depending on the CiMiYiKi signals or the CoMoYoKo signals, the Ki signal can be outputted directly as the Ko signal.

Accordingly, in the image processing apparatus in accordance with claim 1 or 2 arranged as described above, the CiMiYi signals are converted into the CoMoYo signals by the CMY-signal converting means 11, the Ki signal is converted into the Ko signal by the K-signal converting means 21, and the Ki signal is outputted as the Ko signal by the K-signal non-converting output means 22, thereby converting the CiMiYiKi signals into the CoMoYoKo signals.

The CMY-signal converting means 11 can be realized with a small table size and a simple interpolation configuration as the color converting device 12 to 14 or 18 of a three-dimensional-conversion-table referencing type. Also, the K-signal converting means 21 can be realized with a small table size as a one-dimensional gradation converting device. Therefore, in the image processing apparatus according to the first or second aspect of the invention, the CiMiYiKi signals can be converted into the CoMoYoKo signals with a simple configuration equivalent to that in a case where, for instance, the Lab signals are converted into the CMYK signals.

In the image processing apparatus according to the third aspect of the invention, the CMY-signal converting means 11 is constituted by a single color converting device 18 of a three-dimensional-conversion-table referencing type. Since the CiMiYi signals are converted into the CoMoYo signals by the color converting device 18 of a three-dimensional-conversion-table referencing type in a frame-sequential manner, the CiMiYiKi signals can be converted into the CoMoYoKo signals with a simpler configuration.

In the image processing apparatus according to the fourth aspect of the invention, when the input color signals are the CiMiYiKi signals, both the signal converting means 19 and the signal output means 64, 23 are selected by selecting means 80, the CiMiYi signals are converted into the CoMoYo signals by the signal converting means 19. At the same time, the Ki signal is converted into the Ko signal by the signal output means 64, 23, or the Ki signal is outputted as the Ko signal. Meanwhile, in a case where the input color signals are such as the Lab signals or the RGB signals, only the signal converting means 19 is selected by the selecting means 80, and the signals such as the Lab signals or the RGB signals are converted into the CoMoYoKo signals by the signal converting means 19. Thus, not only the CiMiYiKi signals but also such signals as the Lab signals and the RGB signals can be converted into the CoMoYoKo signals by common color converting units.

In the image processing apparatus according to the fifth or sixth aspect of the invention, information to be used in converting device-dependent CiMiYiKi signals, which are generated by the color-signal generating means 212, 222 connected to the network 100 or are stored in the external storage medium 243, with mapping to a physical color space is recognized by the conversion-information recognizing means 320. Since a conversion table in the CMY-signal converting means 19 is set in correspondence with the result of that recognition, the device-dependent CiMiYiKi signals can positively be converted into the CoMoYoKo signals such that the color printed when the CiMiYiKi signals are outputted by an image output device connected to the relevant image processing apparatus matches the color printed when the CiMiYiKi signals are outputted by an image output device for which the CiMiYiKi signals are assumed to be used.

BRIEF DESCRIPTION OF THE DRAWINGS

FIG. 14 shows examples of application software for editing color image information.

DESCRIPTION OF THE PREFERRED EMBODIMENTS

Figure 1:
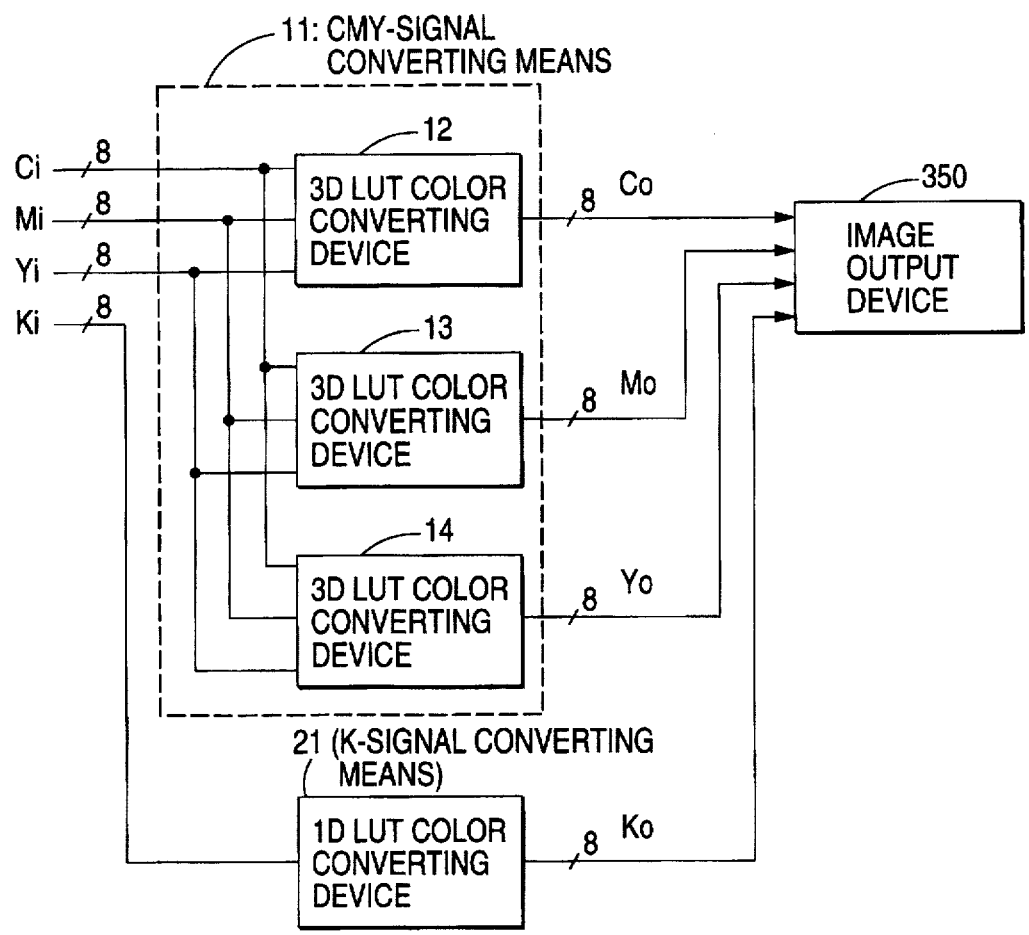
FIG. 1 is a block diagram showing an image processing apparatus according to an embodiment of the present invention.

FIG. 1 illustrates an image processing apparatus according to an embodiment of the present invention, in which case CMYK signals for printing are outputted to an image output device such as a digital color xerography printer.

CiMiYiKi signals, which are CMYK signals for printing, are obtained by quantizing the dot area ratio into 8 bits, respectively. The CiMiYi signals among these signals are converted into CoMoYo signals, which are 8-bit dot-area-ratio signals respectively matched to the color reproduction characteristics of an image output device 350, by three-dimensional LUT color converting devices 12, 13, and 14 which constitute a CMY-signal converting means 11, as will be described later. Meanwhile, the Ki signal is subjected to gradation conversion by a one-dimensional LUT 21 constituting a K-signal converting means, as will be described later, and is thereby converted into a Ko signal, which is an 8-bit dot-area-ratio signal similarly matched to the color reproduction characteristics of the image output device 350. In this example, the CoMoYoKo signals thus obtained are simultaneously inputted to the image output device 350 so as to form a visible image by the image output device 350.

Figure 2:
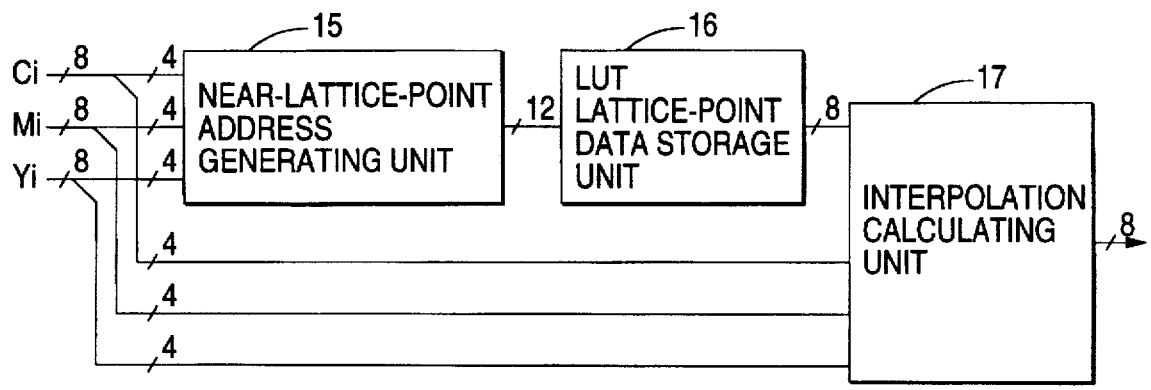
FIG. 2 is a block diagram showing an example of the configuration of each three-dimensional LUT color converting device.

The three-dimensional LUT color converting devices 12, 13, and 14 are respectively configured to effect interpolation by a cubic interpolation, for example. Specifically, a CMY space for representing the CiMiYi signals is divided into 16 segments in the respective axial directions, and is hence divided into a total of 4096 basic cubes to effect interpolation. As shown in FIG. 2, each of the three-dimensional LUT color converting devices 12, 13, and 14 is comprised of a near-lattice-point address generating unit 15, a LUT lattice-point data storage unit 16, and an interpolation calculating unit 17.

Figure 3:
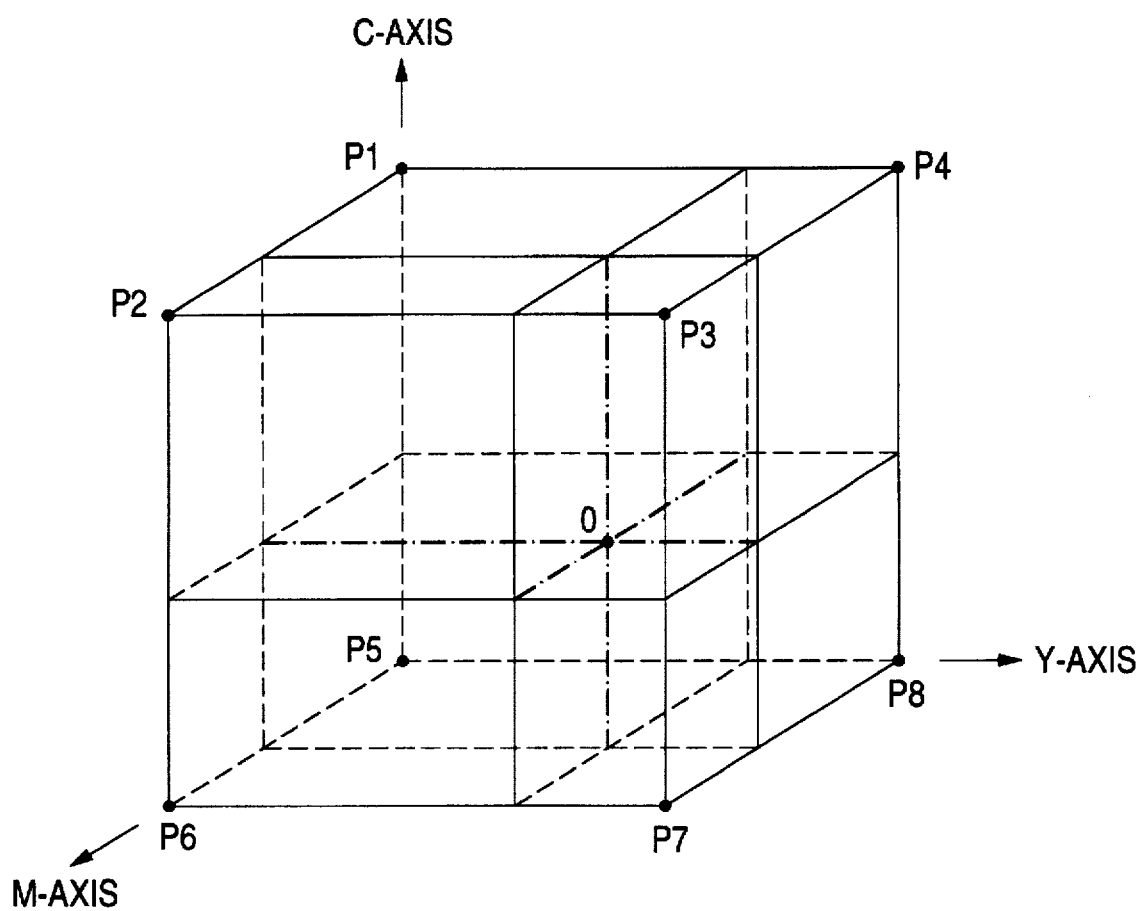
FIG. 3 illustrates cubic interpolation.

Addresses of near lattice points P1 to P8, which are vertices of a basic cube having therein a point (coordinate) O determined by CiMiYi signals respectively having 8 bits in the CMY space as shown in FIG. 3, are generated by the near-lattice-point address generating unit 15 by using the respective four high-order bits of the respective 8-bit CiMiYi signals. The LUT lattice-point data storage unit 16 is accessed by the near-lattice-point addresses which are represented by 12 bits in total.

Stored in advance in the LUT lattice-point data storage unit 16 are lattice-point data, respectively having 8 bits and described later, which are for the Co signal in the case of the three-dimensional LUT color converting device 12, for the Mo signal in the case of the three-dimensional LUT color converting device 13, and for the Yo signal in the case of the three-dimensional LUT color converting device 14 with respect to the eight near lattice points P1 to P8 of the basic cube designated by the near-lattice-point addresses from the near-lattice-point address generating unit 15. The lattice-point data respectively having 8 bits with respect to the eight near lattice points P1 to P8 are consecutively read from the LUT lattice-point data storage unit 16 by means of the near-lattice-point addresses from the near-lattice-point address generating unit 15, and are supplied to the interpolation calculating unit 17.

In addition, the four low-order bits of the CiMiYi signals respectively having 8 bits are supplied to the interpolation calculating unit 17, and an interpolation calculation such as the one described later is effected by the interpolation calculating unit 17. Consequently, the Co signal, the Mo signal, and the Yo signal are respectively obtained as 8-bit data by the respective interpolation calculating units 17 of the three-dimensional LUT color converting devices 12, 13, and 14.

The relationships between the near lattice points P1 to P8 of the basic cube which are respectively determined by the four high-order bits of the CiMiYi signals and the point O in the basic cube are determined by the respective four low-order bits of the CiMiYi signals.

As shown in FIG. 3, in the interpolation calculating unit 17, the basic cube is divided into eight rectangular parallelepipeds by planes which pass through the point O and are parallel to a CM plane, an MY plane, and a YC plane, respectively. If it is assumed that the volumes of the rectangular parallelepipeds in which segments connecting the respective near lattice points P1 to P8 and the point O are set as diagonal lines are V1 to V8, that the total sum of the volumes V1 to V8 is V, and that lattice-point data concerning the near lattice points P1 to P8 from the LUT lattice-point data storage unit 16 are D1 to D8, then it is possible to obtain the following interpolated data value Ans corresponding to the coordinate of the point O:

$$Ans=(D1 \cdot V7+D2 \cdot V8+D3 \cdot V5+D4 \cdot V6+D5 \cdot V3+D6 \cdot V4+D7 \cdot V1+D8 \cdot V2)/V \quad (8)$$

Here, the lattice-point data D1 to D8 are determined in advance such that the color reproduced when an image is printed by the CiMiYi signals matches the reproduced color of an output image obtained by the image output device 350 by converting the CiMiYi signals into CoMoYo signals.

For this reason, an examination is made in advance as to how the CiMiYi signals inputted to the relevant image processing apparatus are mapped to a colorimetric and physical color space, e.g., the Lab space, and how the CoMoYo signals outputted from the relevant image processing apparatus to the image output device 350 are mapped to the same Lab space. In addition, also determined in advance are functions for conversion from the CiMiYi signals into the Lab signals, and functions for conversion from the CoMoYo signals into the Lab signals or functions for conversion from the Lab signals into the CoMoYo signals, which are inverse functions thereof.

The conversion from the CiMiYi signals into the Lab signals is expressed by $$L=fe(Ci, Mi, Yi) \; a=fa(Ci, Mi, Yi) \; b=fb(Ci, Mi, Yi) \quad (9)$$

Meanwhile, the conversion from the Lab signals into the CoMoYo signals is expressed by $$Co=ge(L, a, b) \; Mo=ga(L, a, b) \; Yo=gb(L, a, b) \quad (10)$$

Their functions fe, fa, and fb and ge, ga, and gb can be determined by the Neugebauer's formula described on page 234 of "Theory of Color Reproduction" published by the Printing Bureau of the Printing Society of Japan, or by a method based on the least-squares approximation as polynomials of higher degree on the basis of a plurality of color samples and their colorimetric values using a combination of known dot area ratios, or learning by a neural network. Polynomials of higher degree cannot be generally solved analytically, but can be determined by the technique of computer color matching (CCM).

Accordingly, the conversion from the CiMiYi signals into the CoMoYo signals can be expressed by composite functions of the functions fe, fa, and fb and the functions ge, ga, and gb as follows:

$$Co=ge \cdot fe(Ci, Mi, Yi) \; Mo=ga \cdot fa(Ci, Mi, Yi) \; Yo=gb \cdot fb(Ci, Mi, Yi) \quad (11)$$

The lattice-point data based on the formula for conversion from the CiMiYi signals into the CoMoYo signals thus determined are stored in advance in the respective LUT lattice-point data storage units 16 of the three-dimensional LUT color converting devices 12, 13, and 14. As a result, CoMoYo signals are obtained from the respective interpolation calculating units 17 of the three-dimensional LUT color converting devices 12, 13, and 14, such that the color reproduced when the CoMoYo signals are outputted by the image output device 350 matches the color reproduced when the CiMiYi signals are printed out as assumed.

As for the conversion from the Ki signal into the Ko signal, it suffices if gradation samples of the monochromatic black color when the Ki signal is printed and when the Ko signal is outputted by the image output device 350 are collected in advance for the respective cases, and after the relationship between the dot area ratio and lightness L, i.e., the relationship between the value of the Ki signal or the Ko signal and the lightness L:

$$L(printing)=s(Ki) \quad (12)$$

$$L(image \; output \; device)=t(Ko) \quad (13)$$

is determined for the respective cases, and after the relationship between the Ki signal and the Ko signal is set such that the lightnesses L (printing) and L (image output device) of the two signals become equal, the data are stored in advance in the one-dimensional LUT 21 such that the input/output characteristic of the one-dimensional LUT 21 assumes that relationship.

Since it is assumed that $$s(Ki)=t(Ko) \quad (14)$$

if an inverse function of t is $t^{-1}$, then Ko can be expressed as $$Ko=t^{-1} \cdot s(Ki) \quad (15)$$

Therefore, it suffices if the one-dimensional LUT 21 is configured as a gradation converting device having an input/output characteristic such as the one shown in Formula (15). Hence, the Ko signal is obtained from the one-dimensional LUT 21 such that the lightness at a time when the Ko signal is outputted by the image output device 350 is equal to the lightness at a time when the Ki signal is printed out as assumed.

The example shown in FIG. 2 is a case in which the lattice-point data concerning the eight near lattice points P1 to P8 of the basic cube are transmitted serially from the LUT lattice-point data storage unit 16 to the interpolation calculating unit 17. However, an arrangement may be provided such that the lattice-point data concerning the respective near lattice points are separately stored in advance in eight LUT lattice-point data storage units, and are read therefrom in parallel to the interpolation calculating unit 17. According to this arrangement, processing can be carried out at a higher speed.

In the case where the cubic interpolation is used, instead of being divided into 16 segments in the respective axial directions, the CMY space for representing the CiMiYi signals may be divided into, for instance, 8 or 32 segments in the respective axial directions within the range of the number of divisions which can be shown by 8 bits or less. Still alternatively, the CMY space may not be divided into the same number of divisions in the respective axial directions, and may be divided into 16 segments in the C-axis direction, for example, and into 8 segments in the M- and Y-axis directions, respectively. Thus, the configuration of interpolation may be modified, as necessary.

In addition, instead of the cubic interpolation, it is possible to use other interpolation methods such as a triangular prism interpolation and an oblique triangular prism interpolation which are described in Transactions of 1993 24th Image Engineering Conference, pp. 347 to 350, or a tetrahedral interpolation disclosed in aforementioned publication No. Hei. 2-87192.

Further, the respective components of the CiMiYi signals and CoMoYo signals may not necessarily be 8 bits.

Depending on the CiMiYi signals which are CMYK signals for printing or the color reproduction characteristics of the image output device 350, there are cases where the functions s and t in Formula (14) are equal, so that the Ki signal can be outputted as it is as the Ko signal without being converted.

Figure 4:
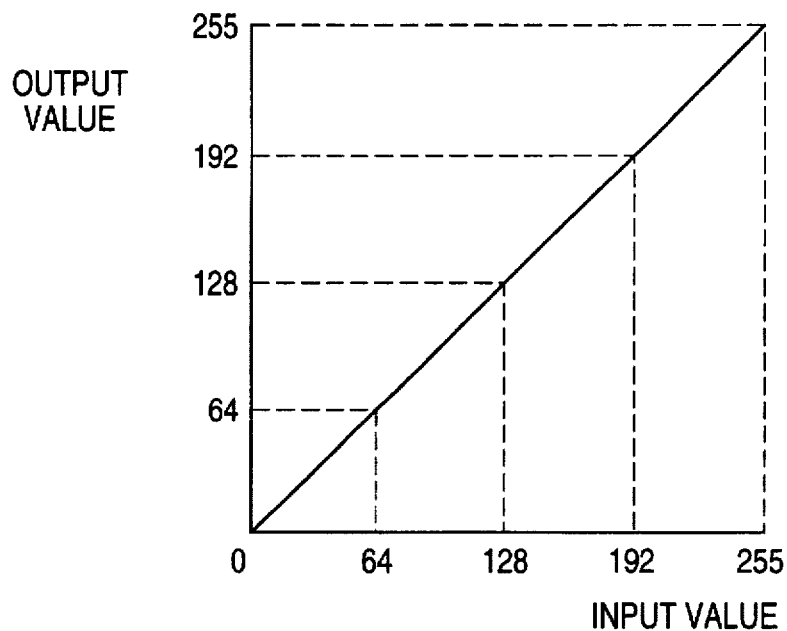
FIG. 4 shows an example of the input/output characteristic of a one-dimensional LUT.

In that case, it is sufficient to use a K-signal non-converting output means in which data having an input/ output characteristic of using input values directly as output values, as shown in FIG. 4, are stored in advance in the one-dimensional LUT 21 in the example shown in FIG. 1, and the one-dimensional LUT 21 outputs the Ki signal as the Ko signal without substantially converting the Ki signal. Alternatively, as shown in FIG. 5, it is possible to use a K-signal non-converting output means which is not provided with the one-dimensional LUT 21, and in which a line 22 for inputting the Ki signal is used as a line for outputting the Ko signal, and the line 22 outputs the Ki signal as the Ko signal without substantially or formally converting the Ki signal.

Figure 5:
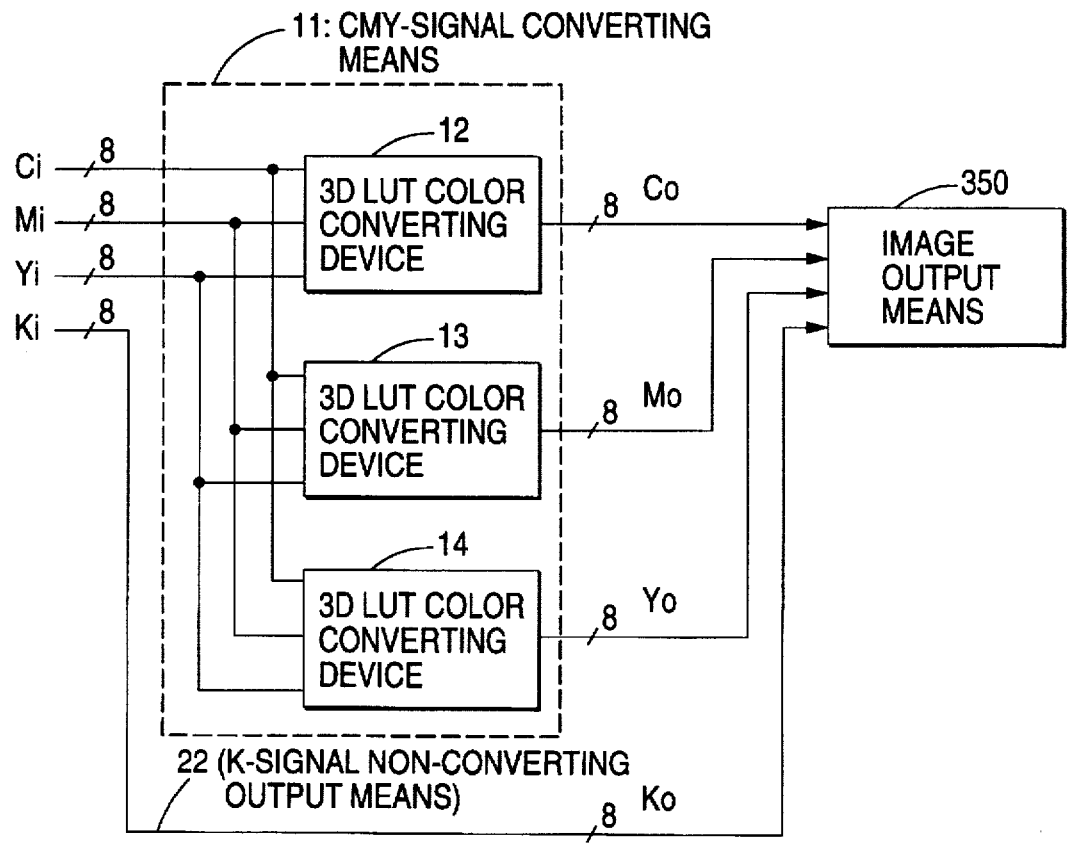
FIG. 5 is a block diagram showing an image processing apparatus according to another embodiment of the invention.

According to the embodiment shown in FIG. 1 or 5, CiMiYi signals which are particular CMYK signals can be converted into CoMoYo signals which are other CMYK signals by using a simple configuration equivalent to that in the case adapted for three inputs in terms of the table size and the interpolation configuration of the color converting means of a conversion-table referencing type, and with high accuracy equivalent to that in the case adapted for four inputs in terms of the conversion accuracy.

Figure 6:
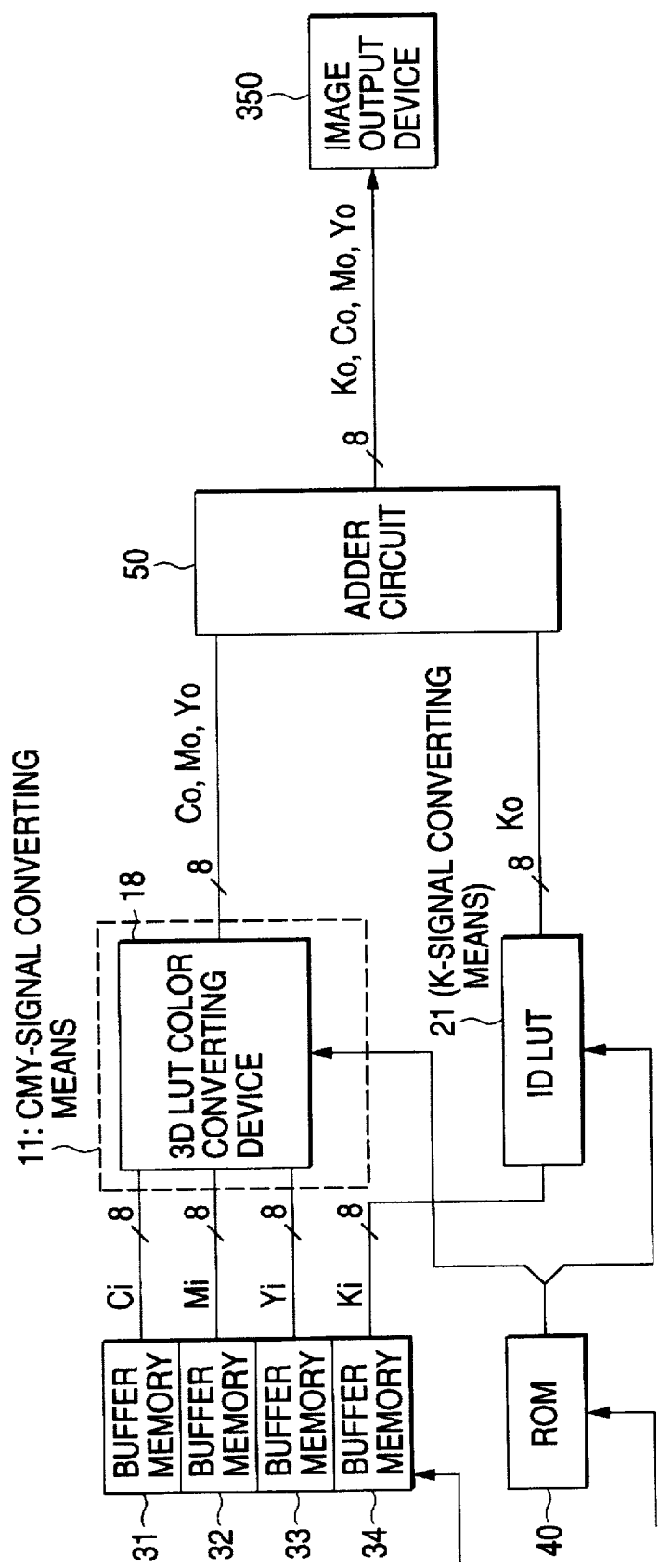
FIG. 6 is a block diagram showing an image processing apparatus according to still another embodiment of the invention.

FIG. 6 shows an image processing apparatus according to another embodiment of the present invention, in which case CoMoYoKo signals are obtained in a frame-sequential manner and are outputted to the image output device in a frame-sequential manner.

In this embodiment, a one-page portion of CiMiYiKi signals is written in advance in buffer memories 31, 32, 33, and 34, respectively. The CMY-signal converting means 11 is constituted by a single three-dimensional LUT color converting device 18, and converts CiMiYi signals into CoMoYo signals in a frame-sequential manner, as will be described later. The one-dimensional LUT 21 constitutes the K-signal converting means in the same way as in the embodiment shown in FIG. 1.

In this example, however, conversion tables are set in the three-dimensional LUT color converting device 18 and the one-dimensional LUT 21 from a ROM 40, as will be described later. In addition, outputs from the three-dimensional LUT color converting device 18 and the one-dimensional LUT 21 are added by an adder circuit 50, and an output from the adder circuit 50 is supplied to the image output device 350.

Figure 7:
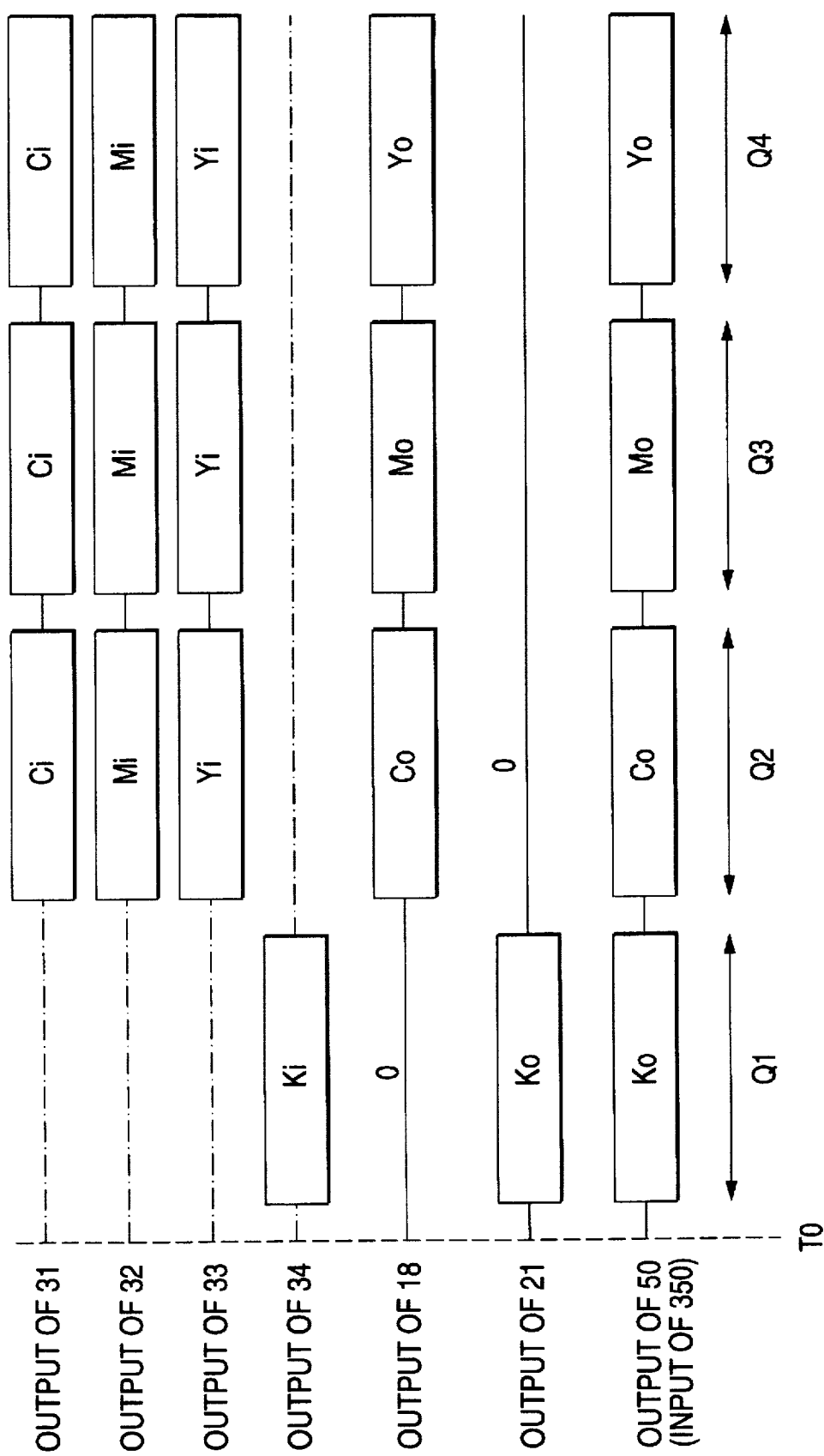
FIG. 7 is a timing chart showing the operation of the image processing apparatus of FIG. 6.

A one-page portion of CiMiYiKi signals is stored in the buffer memories 31 to 34 until a timing T0 shown in FIG. 7. Immediately after the timing T0, a conversion table for subjecting the Ki signals to gradation conversion into the Ko signals is set in the one-dimensional LUT 21 from the ROM 40. During a subsequent period Q1, a one-page portion of the Ki signals is read from the buffer memory 34, and is inputted to the one-dimensional LUT 21, which, in turn, converts the Ki signals into the Ko signals.

Since as the aforementioned lattice-point data 0s are set in the three-dimensional LUT color converting device 18 from the ROM 40 immediately after the timing T0, or since the outputs from the buffer memories 31 to 33 are respectively set at 0s during the period Q1, the output from the three-dimensional LUT color converting device 18 becomes 0 during the period Q1. Accordingly, the Ko signals are outputted from the adder circuit 50 to the image output device 350 during the period Q1.

Immediately after the period Q1, a conversion table, which is similar to the one set in the three-dimensional LUT color converting device 12 in the embodiment shown in FIG. 1, is set in the three-dimensional LUT color converting device 18 from the ROM 40 so as to convert the CiMiYi signals into Co signals. During a subsequent period Q2, a one-page portion of the CiMiYi signals is read from the buffer memories 31 to 33, and is inputted to the three-dimensional LUT color converting device 18, which, in turn, converts the CiMiYi signals into the Co signals.

Since as the conversion table 0s are set in the one-dimensional LUT 21 from the ROM 40 immediately after the period Q1, or since the output from the buffer memory 34 is set at 0 during the period Q2, the output from the one-dimensional LUT 21 becomes 0 during the period Q2. Accordingly, the Co signals are outputted from the adder circuit 50 to the image output device 350 during the period Q2.

Similarly, immediately after the period Q2, a conversion table for converting the CiMiYi signals into Mo signals is set in the three-dimensional LUT color converting device 18 from the ROM 40. During a subsequent period Q3, a one-page portion of the CiMiYi signals is read from the buffer memories 31 to 33, and is converted into the Mo signals by the three-dimensional LUT color converting device 18, and the Mo signals are supplied to the image output device 350 through the adder circuit 50.

Further, immediately after the period Q3, a conversion table for converting the CiMiYi signals into Yo signals is set in the three-dimensional LUT color converting device 18 from the ROM 40. During a subsequent period Q4, a one-page portion of the CiMiYi signals is read from the buffer memories 31 to 33, and is converted into the Yo signals by the three-dimensional LUT color converting device 18, and the Yo signals are supplied to the image output device 350 through the adder circuit 50.

In the above-described manner, the CoMoYoKo signals are outputted from the image processing apparatus to the image output device 350 in a frame-sequential manner.

In this embodiment, since the CMY-signal converting means 11 can be constituted by one three-dimensional LUT color converting device 18, the CiMiYiKi signals can be converted into the CoMoYoKo signals with a simpler configuration than that in the embodiment shown in FIG. 1.

Incidentally, the sequence of the signals outputted to the image output device 350 can be arbitrarily set, in conformity to the sequence of printing by the image output device 350, by a control unit for controlling the setting of conversion tables in the three-dimensional LUT color converting device 18 and the one-dimensional LUT 21 from the ROM 40 as well as the reading of signals from the buffer memories 31 to 34.

In addition, the buffer memories 31 to 34 are a mere example of a means for repeatedly obtaining the CiMiYi signals, in particular, and the buffer memories 31 to 34 are not necessarily required in a case where CiMiYiKi signals are stored in a storage means such as an external storage medium. Furthermore, a selector or a switching circuit may be used instead of the adder circuit 50.

In this embodiment as well, in a case where the Ki signals can be outputted directly as the Ko signals without being converted, it suffices if data having the input/output characteristic such as the one shown in FIG. 4 are set in the one-dimensional LUT 21 from the ROM 40, or if the input line for the Ki signals on such as the output side of the buffer memory 34 is used as it is as the output line for the Ko signals.

Figure 8:
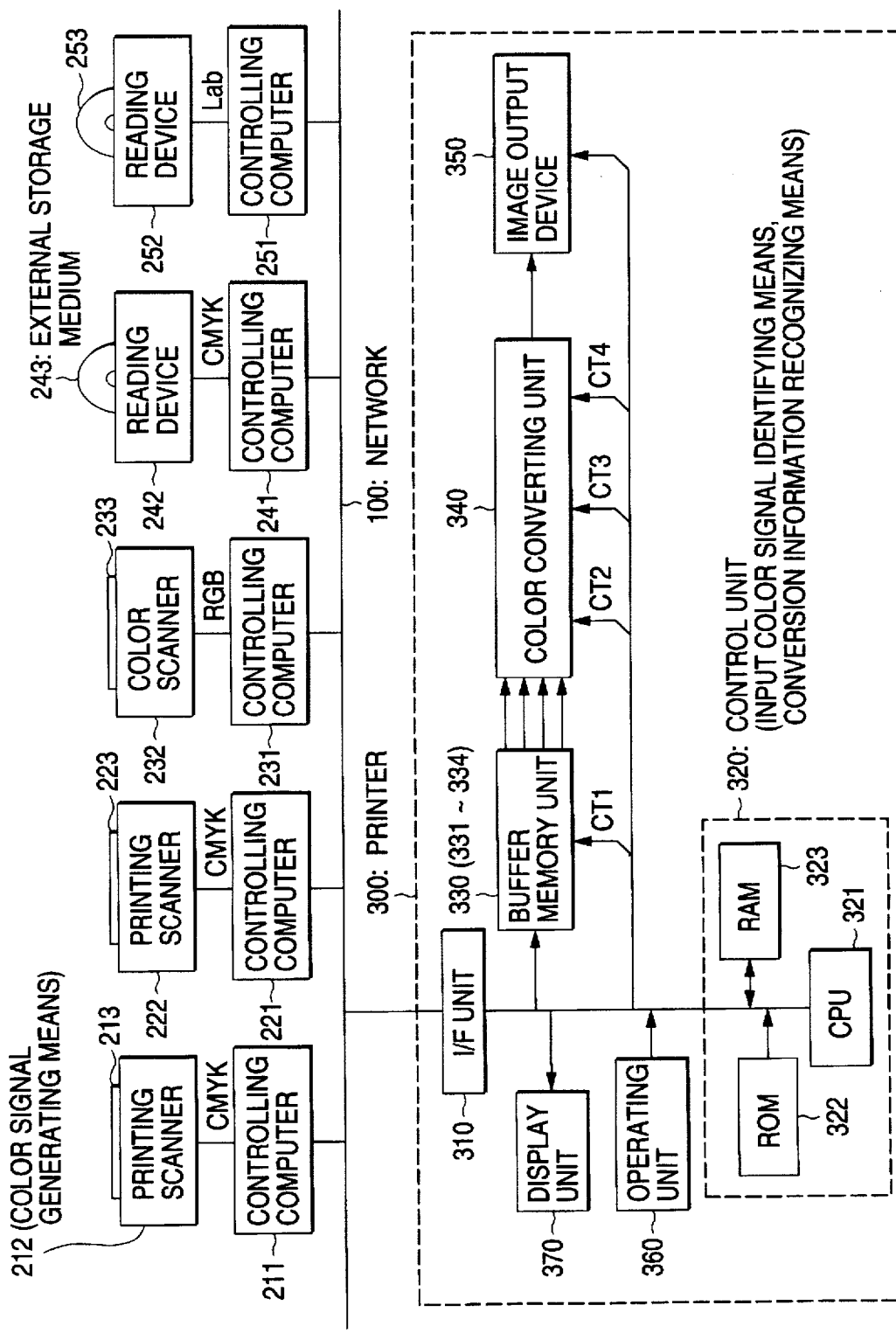
FIG. 8 is a block diagram showing an example of a network image output system which uses an image processing apparatus according to a further embodiment of the invention.

FIG. 8 illustrates an example of a network image output system which uses an image processing apparatus according to still another embodiment of the present invention, in which case color signals, which are CMYK signals, RGB signals, or Lab signals generated by a color-signal generating means connected to a network or transmitted from an external storage medium, are converted into other CMYK signals or monochromatic K, C, M, or Y signals, and are printed out by a printer connected to the network.

That is, a printing scanner 212, a printing scanner 222, a color scanner 232, a reading device 242, and a reading device 252 are connected to a network 100 via, for example, controlling computers 211, 221, 231, 241, and 251, respectively.

The printing scanners 212 and 222 are for obtaining RGB signals by reading reversal films 213 and 223, respectively, and for converting the RGB signals into particular CMYK signals for printing. As for the printing scanner 212 and the printing scanner 222, however, particular CMYK signals from them differ from each other because their manufacturers are different or for other reasons.

For this reason, the CMYK signals as well as information to be used in converting the CMYK signals with mapping to a physical color space, e.g., the Lab space are transmitted from the controlling computers 211 and 221 to the network 100.

The color scanner 232 is for obtaining RGB signals by reading an original 233 and for outputting the RGB signals as they are. The RGB signals from the color scanner 232 as well as information to be used in converting the RGB signals with mapping to a physical color space, e.g., the Lab space are transmitted from the controlling computer 231 to the network 100.

The reading devices 242 and 252 are, for example, CD-ROM readers for reading color signals recorded in external storage media 243 and 253 such as CD-ROMs. However, particular CMYK signals are read from the external storage medium 243, while Lab signals are read from the external storage medium 253.

For this reason, particular CMYK signals from the external storage medium 243, as well as information to be used in converting the CMYK signals with mapping to a physical color space, e.g., the Lab space are transmitted from the controlling computer 241 to the network 100. In addition, the Lab signals from the external storage medium 253, as well as information indicating that the color signals are the Lab signals, are transmitted from the controlling computer 251 to the network 100.

Incidentally, the aforementioned conversion information which is added to the particular CMYK signals or RGB signals from the printing scanners 212, 222, the color scanner 232, and the reading device 242 also naturally indicates the type of the respective color signals, i.e., that the respective color signals are the CMYK signals or the RGB signals.

A printer 300 is connected to the network 100. This printer 300 is provided with, for instance, an interface unit 310, a control unit 320, a buffer memory unit 330, a color converting unit 340, the image output device 350, an operating unit 360, and a display unit 370.

The control unit 320 controls the overall printer 300, and is comprised of a CPU 321, a ROM 322 in which a control program and the like to be executed by the CPU 321 is written, and a RAM 323 which is used as a work area for the CPU 321.

This control unit 320 also serves as an input-color-signal identifying means and a conversion-information recognizing means, and is adapted to identify, from the aforementioned input-color-signal identification information, the type of the input color signals, i.e., whether the input color signals are CMYK signals, RGB signals, or Lab signals, and is also adapted to recognize the aforementioned conversion information so as to generate control signals CT1, CT2, CT3, and CT4 which will be described later.

The buffer memory unit 330 is for temporarily storing a one-page portion of input color signals so that the CMYK signals will be outputted to the image output device 350 in a frame-sequential manner, as will be described later. The buffer memory unit 330 has four buffer memories 331 to 334. The control signal CT1 for controlling the writing and reading of the input color signals is supplied to the buffer memory unit 330.

The color converting unit 340 forms an essential portion of the image processing apparatus of the printer 300, and has a configuration such as the one shown in FIG. 9 or 12, as will be described later. The color signals read from the buffer memory unit 330, as well as the control signals CT2, CT3, and CT4, are supplied to the color converting unit 340.

The image output device 350 is, for instance, a xerographic printer for printing out a CMYK color image by CMYK signals which are outputted from the color converting unit 340 in a frame-sequential manner.

The operating unit 360 and the display unit 370 constitute user interfaces of the printer 300. This example is a case in which if the input color signals are RGB signals or Lab signals, the output image can be printed out in a monochromatic color, as will be described later. However, whether a full-color image is to be outputted or a monochromatic color image is to be outputted is determined by an instruction from the controlling computers 231, 251 or the operation of the operating unit 360.

Figure 9:
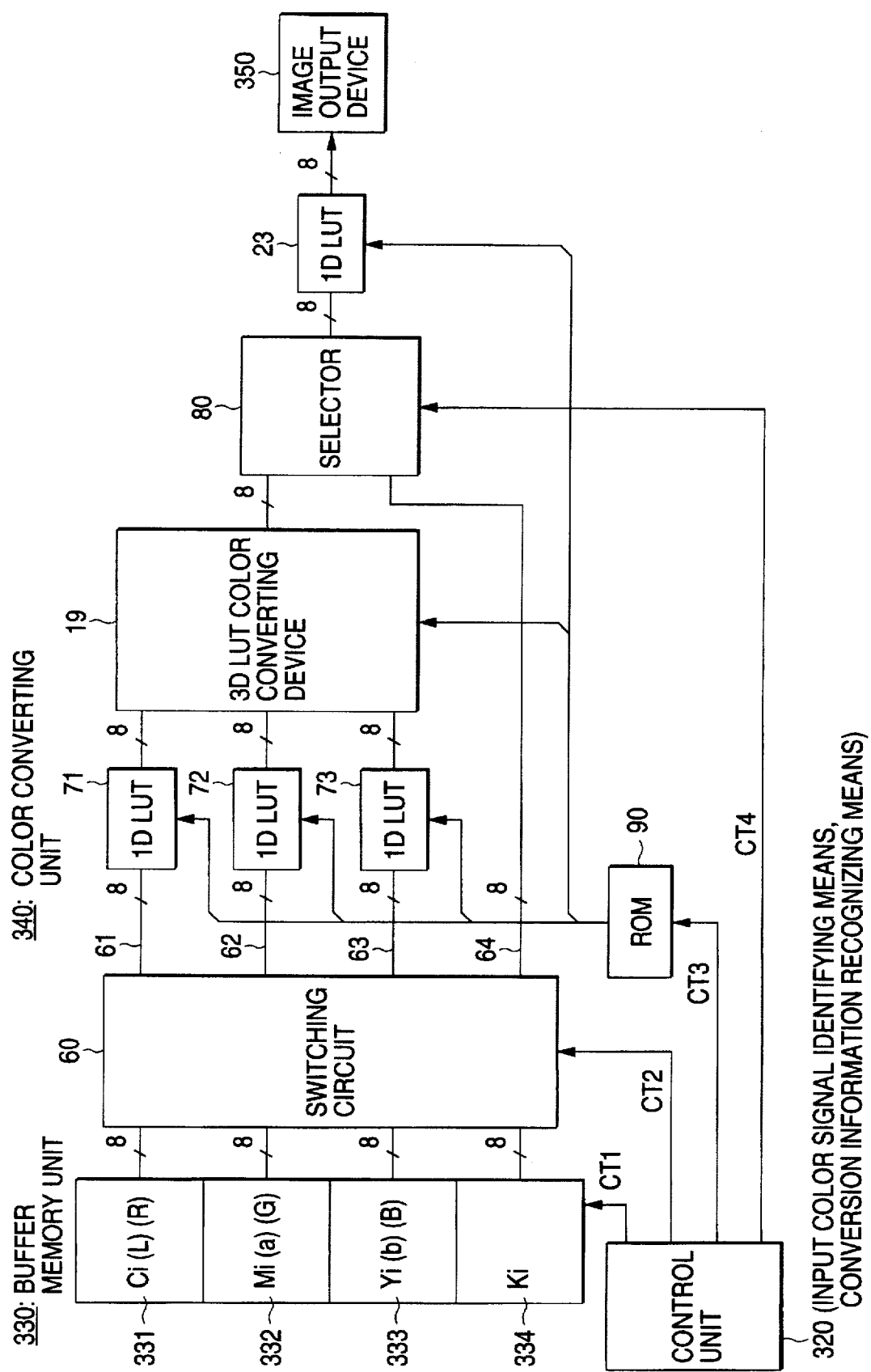
FIG. 9 is a block diagram showing an example of the image processing apparatus of the invention which is used in the system of FIG. 8.

FIG. 9 shows an example of the color converting unit 340. The color converting unit 340 is provided with a switching circuit 60, one-dimensional LUTs 71 to 73, a three-dimensional LUT color converting device 19, a selector 80, a one-dimensional LUT 23, and a ROM 90.

The switching circuit 60 assigns and outputs the signals read from the buffer memories 331 to 334 of the buffer memory unit 330 to output lines 61 to 64 by means of the control signal CT2.

The one-dimensional LUTs 71 to 73 outputs the signals sent to the respective lines 61 to 63 without substantially converting them or by subjecting them to gradation conversion by using a conversion table set from the ROM 90.

The three-dimensional LUT color converting device 19 converts the signals from the one-dimensional LUTs 71 to 73 into CoMoYo signals for the image output device 350 in a frame-sequential manner by using a conversion table set from the ROM 90.

The selector 80 selects either the output by the three-dimensional LUT color converting device 19 or the output by the line 64 on the basis of the control signal CT4. Meanwhile, the one-dimensional LUT 23 outputs to the image output device 350 the signals from the selector 80 by subjecting them to gradation conversion by means of a conversion table set from the ROM 90 or without substantially converting them.

Various kinds of conversion tables, which will be described later, are stored in advance in the ROM 90, and those tables which are selected among them, as will be described later, are set in the one-dimensional LUTs 71 to 73, the three-dimensional LUT color converting device 19, and the one-dimensional LUT 23.

In a case where CiMiYiKi signals, which are particular CMYK signals from the printing scanners 212, 222 or the external storage medium 243 shown in FIG. 8, are transmitted to the printer 300 as input color signals, a one-page portion of Ci, Mi, Yi, and Ki signals are stored in the buffer memories 331, 332, 333, and 334, as shown in FIG. 9, by means of the control signal CT1 from the control unit 320 which also serves as the input-color-signal identifying means and the conversion-information recognizing means.

Figure 10:
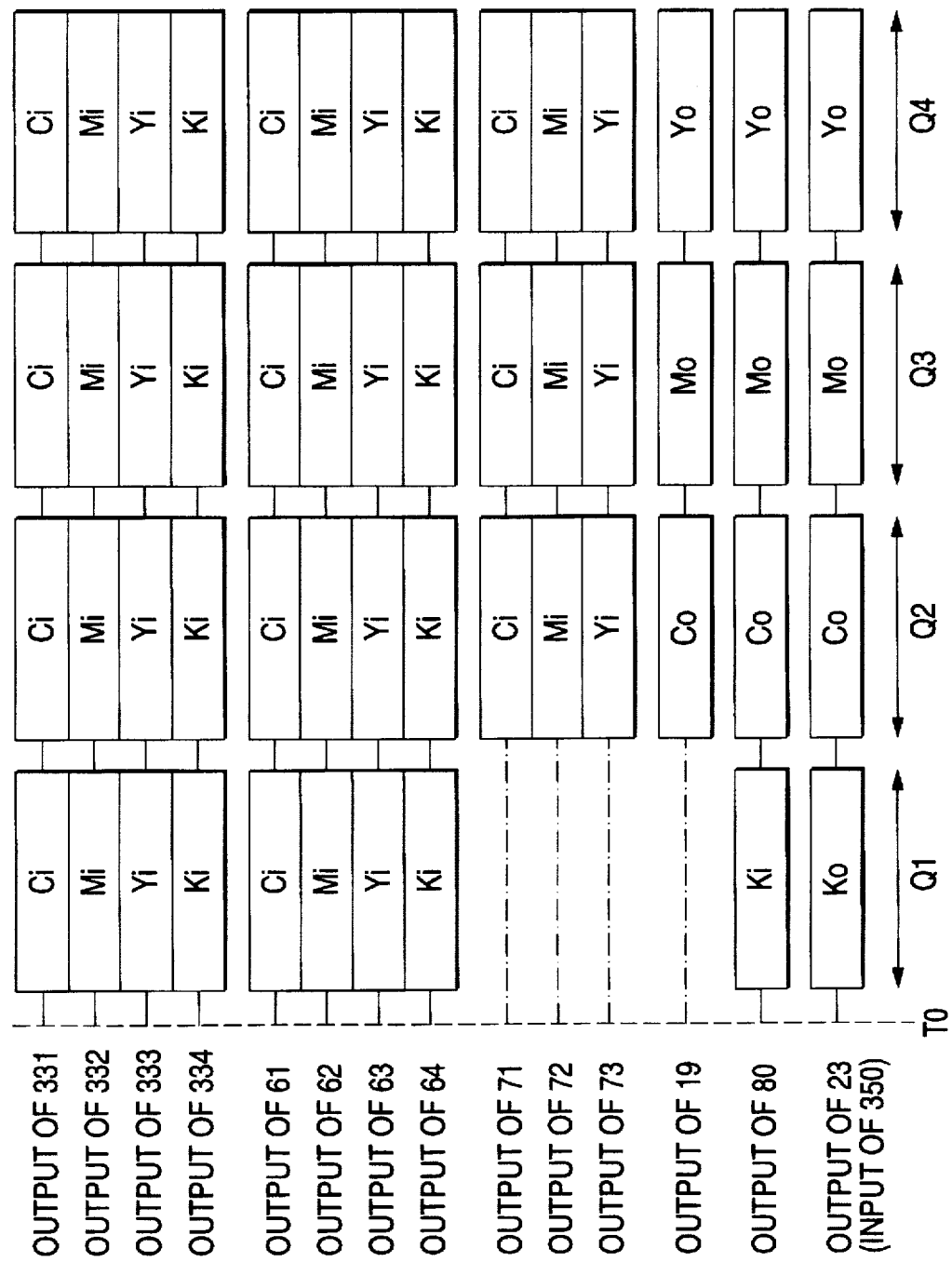
FIGS. 10 and 11 are timing charts showing the operation of the image processing apparatus of FIG. 9.

If CiMiYiKi signals are stored in the buffer memories 331 to 334 until the timing T0 shown in FIG. 10, a one-page portion of CiMiYiKi signals is repeatedly read from the buffer memories 331 to 334 during periods Q1, Q2, Q3, and Q4, respectively, subsequent to the timing T0 by means of the control signal CT1.

In this case, the switching circuit 60 is changed over in such a manner as to direct the Ci, Mi, Yi, and Ki signals from the respective buffer memories 331, 332, 333, and 334 to the lines 61, 62, 63, and 64 by means of the control signal CT2, as shown in FIG. 10.

If it is assumed that the printing by the image output device 350 is effected in the order of K, C, M, and Y, a conversion table for subjecting the Ki signals to gradation conversion into the Ko signals for the image output device 350 is set in the one-dimensional LUT 23 from the ROM 90 by means of the control signal CT3 immediately after the timing T0. In addition, during the period Q1, the selector 80 is set in a state for selecting the signals on the line 64 by means of the control signal CT4.

However, since the CiMiYiKi signals from the printing scanners 212, 222 and the external storage medium 243 shown in FIG. 8 are respectively device-dependent signals, and are mutually different, an appropriate conversion table is selected as the conversion table set in the one-dimensional LUT 23 depending on the scanner or external storage medium from which the CiMiYiKi signals, i.e., the input color signals, are inputted.

Accordingly, during the period Q1, the Ki signals on the line 64 are subjected to gradation conversion by the one-dimensional LUT 23, which, in turn, outputs the Ko signals to the image output device 350.

Immediately after the period Q1, conversion tables respectively having input/output characteristics of using input values directly as output values, as shown in FIG. 4, are set in the one-dimensional LUTs 71 to 73 and 23 from the ROM 90. In and after the period Q2, the selector 80 is set in a state for selecting the output from the three-dimensional LUT color converting device 19.

Then, immediately after the period Q1, i.e., immediately before the period Q2, a conversion table for converting the CiMiYi signals into Co signals for the image output device 350, such as the one set in the three-dimensional LUT color converting device 12 in the embodiment shown in FIG. 1, is set in the three-dimensional LUT color converting device 19 from the ROM 90. However, an appropriate conversion table is selected as that conversion table depending on the scanner or external storage medium from which the CiMiYiKi signals, i.e., the input color signals, are inputted.

Accordingly, during the period Q2, the CiMiYi signals on the lines 61 to 63 are inputted from the one-dimensional LUTs 71 to 73 to the three-dimensional LUT color converting device 19 without being substantially converted, and are converted into the Co signals by the three-dimensional LUT color converting device 19. The Co signals are outputted from the one-dimensional LUT 23 to the image output device 350 without being substantially converted.

Immediately before the period Q3, a conversion table for converting the CiMiYi signals into the Mo signals for the image output device 350, such as the one set in the three-dimensional LUT color converting device 13 in the embodiment shown in FIG. 1, is set in the three-dimensional LUT color converting device 19 from the ROM 90. However, an appropriate conversion table is selected as that conversion table depending on the scanner or external storage medium from which the CiMiYiKi signals are inputted.

Accordingly, during the period Q3, the CiMiYi signals on the lines 61 to 63, i.e., the signals from the one-dimensional LUTs 71 to 73, are converted into the Mo signals by the three-dimensional LUT color converting device 19, and the Mo signals are outputted from the one-dimensional LUT 23 to the image output device 350.

Similarly, immediately before the period Q4, a conversion table for converting the CiMiYi signals into the Yo signals for the image output device 350 is set in the three-dimensional LUT color converting device 19. During the period Q4, the CiMiYi signals are converted into the Yo signals by the three-dimensional LUT color converting device 19, and the Yo signals are outputted from the one-dimensional LUT 23 to the image output device 350.

In the above-described manner, the CoMoYoKo signals, which are obtained by converting the CiMiYiKi signals, i.e., the input color signals, are transmitted from the image processing apparatus to the image output device 350 in a frame-sequential manner in the order of the Ko, Co, Mo, and Yo signals. Each plate is printed by the image output device 350 in that order, thereby forming a CMYK color image. It goes without saying that the order of outputting the CoMoYoKo signals from the image processing apparatus can be arbitrarily set by the control unit 320 in correspondence with the order of printing by the image output device 350.

In a case where the Lab signals from the external storage medium 253 shown in FIG. 8 are transmitted as input color signals to the printer 300, a one-page portion of L, a, and b signals is stored in the buffer memories 331, 332, and 333 by means of the control signal CT1 from the control unit 320.

In the case where the input color signals are the Lab signals in the above-described manner, the switching circuit 60 is changed over in such a manner as to direct the L, a, and b signals from the respective buffer memories 331, 332, and 333 to the lines 61, 62, and 63 and the L signal from the buffer memory 331 to the line 64 as well.

Figure 11:
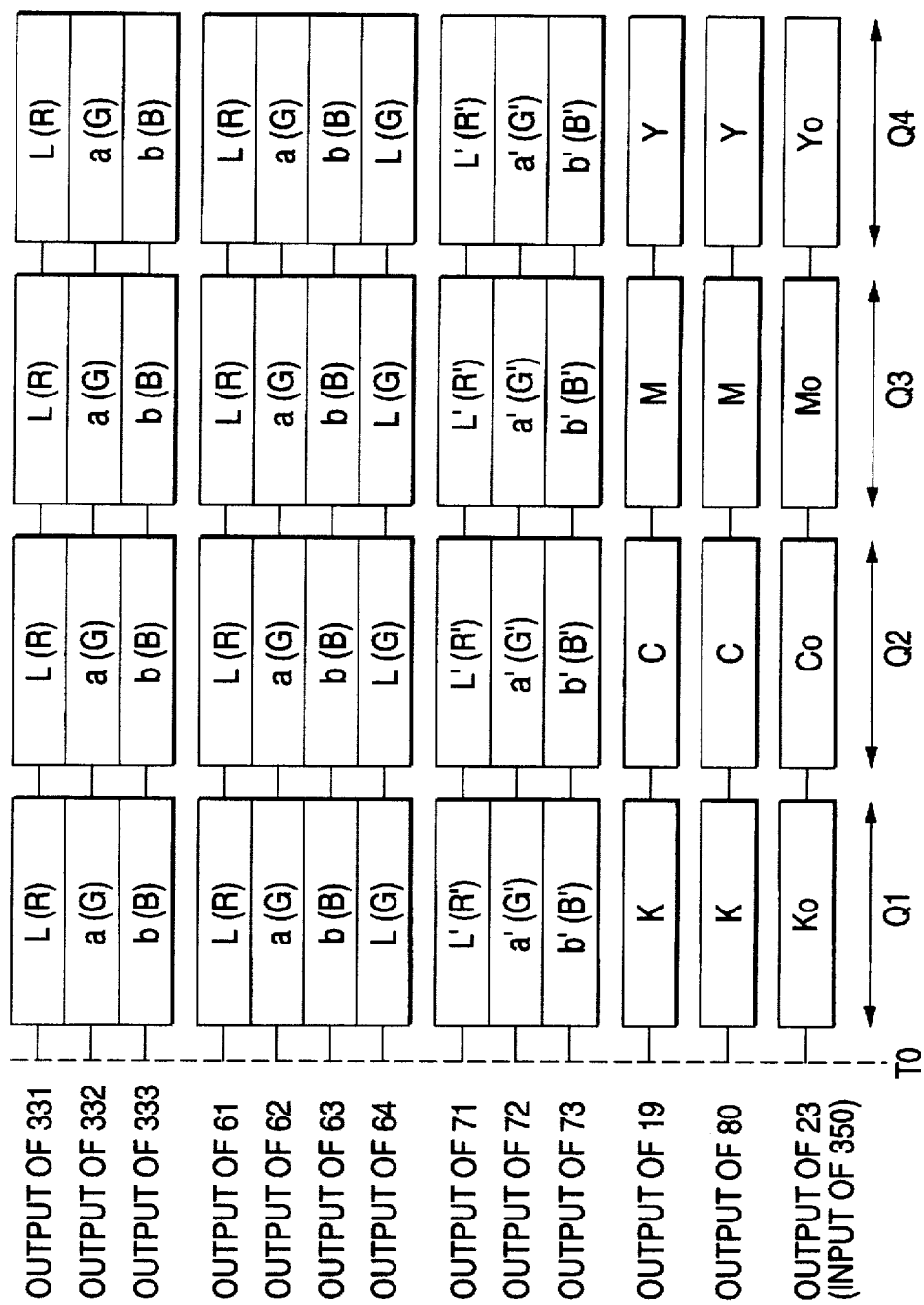

In a case where a full-color image is outputted, a one-page portion of the Lab signals is stored in the buffer memories 331 to 333 until the timing T0 shown in FIG. 11, the one-page portion of the Lab signals is repeatedly read from the buffer memories 331 to 333 by means of the control signal CT1 during the periods Q1 to Q4 subsequent to the timing T0. Accordingly, as shown in the drawing, during the periods Q1 to Q4, the L, a, and b signals are repeatedly outputted to the lines 61, 62, and 63, and the L signals are repeatedly outputted to the line 64.

However, in a case where a full-color image is outputted, the selector 80 is constantly set in a state for selecting the signals from the three-dimensional LUT color converting device 19 by means of the control signal CT4, so that the L signals on the line 64 are not involved in outputting an image.

Until immediately after the timing T0 at the latest, conversion tables for correcting the difference in size between the color reproduction space of input color signals, i.e., the Lab signals, and the color reproduction space in the image output device 350 are set in the one-dimensional LUTs 71 to 73 from the ROM 90 by means of the control signal CT3.

Accordingly, the Lab signals on the lines 61 to 63 are subjected to range conversion by the one-dimensional LUTs 71 to 73 in correspondence with the color reproduction space in the image output device 350. Thus, as shown in FIG. 11, during the periods Q1 to Q4, L', a', and b' signals subjected to range conversion are obtained from the one-dimensional LUTs 71, 72, and 73.

If it is assumed that the printing by the image output device 350 is effected in the order of K, C, M, and Y, until immediately after the timing T0 at the latest, a conversion table for converting the L'a'b' signals into the K signals is set in the three-dimensional LUT color converting device 19 from the ROM 90 by means of the control signal CT3, while a conversion table for gradation correction of the K signals is set in the one-dimensional LUT 23 from the ROM 90.

Therefore, during the period Q1, the L'a'b' signals from the one-dimensional LUTs 71 to 73 are converted into the K signals by the three-dimensional LUT color converting device 19. Further, the K signals are subjected to gradation correction by the one-dimensional LUT 23, thereby making it possible to obtain the Ko signals for the image output device 350. However, the gradation correction characteristic of the one-dimensional LUT 23 is provided such that at the time when the image on a K plate is outputted by the image output device 350 by means of the Ko signals from the one-dimensional LUT 23, the dot area ratio and lightness of the K-plate image assume a linear relationship.

Immediately after the period Q1, a conversion table for converting the L'a'b' signals into the C signals is set in the three-dimensional LUT color converting device 19 from the ROM 90, and a conversion table for the gradation correction of the C signals is set in the one-dimensional LUT 23 from the ROM 90.

Accordingly, during the period Q2, the L'a'b' signals from the one-dimensional LUTs 71 to 73 are converted into the C signals by the three-dimensional LUT color converting device 19, and the C signals are further subjected to gradation correction by the one-dimensional LUT 23, thereby making it possible to obtain the Co signals for the image output device 350. The gradation correction characteristic of the one-dimensional LUT 23 at this time is also provided such that at the time when the image on a C plate is outputted by the image output device 350 by means of the Co signals from the one-dimensional LUT 23, the dot area ratio and lightness of the C-plate image assume a linear relationship.

Immediately after the period Q2, a conversion table for converting the L'a'b' signals into the M signals is set in the three-dimensional LUT color converting device 19 from the ROM 90, and a conversion table for the gradation correction of the M signals is set in the one-dimensional LUT 23 from the ROM 90.

Accordingly, during the period Q3, the L'a'b' signals from the one-dimensional LUTs 71 to 73 are converted into the M signals by the three-dimensional LUT color converting device 19, and the M signals are further subjected to gradation correction by the one-dimensional LUT 23, thereby making it possible to obtain the Mo signals for the image output device 350. The gradation correction characteristic of the one-dimensional LUT 23 at this time is also provided such that at the time when the image on an M plate is outputted by the image output device 350 by means of the Mo signals from the one-dimensional LUT 23, the dot area ratio and lightness of the M-plate image assume a linear relationship.

Immediately after the period Q3, a conversion table for converting the L'a'b' signals into the Y signals is set in the three-dimensional LUT color converting device 19 from the ROM 90, and a conversion table for the gradation correction of the Y signals is set in the one-dimensional LUT 23 from the ROM 90.

Accordingly, during the period Q4, the L'a'b' signals from the one-dimensional LUTs 71 to 73 are converted into the Y signals by the three-dimensional LUT color converting device 19, and the Y signals are further subjected to gradation correction by the one-dimensional LUT 23, thereby making it possible to obtain the Yo signals for the image output device 350. However, since the Y signals consist of only a saturation component, the gradation correction characteristic of the one-dimensional LUT 23 at this time is provided such that at the time when the image on a Y plate is outputted by the image output device 350 by means of the Yo signals from the one-dimensional LUT 23, the dot area ratio and saturation (the saturation can be expressed by a square root of the sum of the square of an a-axis component and the square of a b-axis component in the Lab space) of the Y-plate image assume a linear relationship.

In the above-described manner, the CoMoYoKo signals obtained by converting the Lab signals are outputted from the one-dimensional LUT 23 to the image output device 350 in a frame-sequential manner in the order of the Ko, Co, Mo, and Yo signals, thereby allowing a CMYK full-color image to be outputted from the image output device 350. In this case as well, the order of outputting the CoMoYoKo signals from the image processing apparatus can be arbitrarily set by the control unit 320 in correspondence with the order of printing by the image output device 350.

In a case where a monochrome image is outputted, in the same way as the case of outputting a full-color image, the switching circuit 60 is changed over in such a manner as to direct the L, a, and b signals from the respective buffer memories 331, 332, and 333 to the lines 61, 62, and 63 and the L signal from the buffer memory 331 to the line 64 as well. However, the selector 80 is set in a state for selecting the L signals on the line 64 oppositely to the case of outputting a full-color image.

Then, the Lab signals are read from the buffer memories 331 to 333, and before the L signals are outputted to the line 64 a conversion table for subjecting the L signals to gradation conversion for monochrome use is set in advance in the one-dimensional LUT 23 from the ROM 90 by means of the control signal CT3.

Accordingly, in the case where a monochrome image is outputted, the L signals obtained on the line 64 are subjected to gradation conversion by the one-dimensional LUT 23, and L" signals subjected to gradation conversion by the one-dimensional LUT 23 are supplied to the image output device 350, thereby outputting a monochrome image by the image output device 350.

In this case, for the same reason as that described above for the case where a full-color image is outputted, in a case where a monochrome image formed on a K plate, a C plate, or an M plate is outputted, the gradation conversion characteristic of the one-dimensional LUT 23 is provided such that the dot area ratio and lightness of the output image of the K plate, C plate, or M plate assume a linear relationship. Meanwhile, in a case where a monochrome image formed on a Y plate is outputted, the gradation conversion characteristic of the one-dimensional LUT 23 is provided such that the dot area ratio and saturation of the output image of the Y plate assume a linear relationship.

Also, the above-described operation basically applies to the case where RGB signals from the color scanner 232 shown in FIG. 8 are transmitted to the printer 300 as input color signals.

That is, in this case, as shown in FIG. 11 which illustrates the case where the R, G, and B signals are stored in the buffer memories 331, 332, and 333 as shown in FIG. 9, and a monochrome image is outputted, the switching circuit 60 is changed over in such a manner as to direct the R, G, and B signals from the buffer memories 331, 332, and 333 to the lines 61, 62, and 63 and direct the G signal from the buffer memory 332 to the line 64 as well. The G signal corresponds to the L signal, i.e., the lightness signal among the Lab signals, and most contains lightness information among the RGB signals.

Alternatively, the G, R, and B signals are respectively stored in the buffer memories 331, 332, and 333, and the switching circuit 60 is changed over in such a manner as to direct the G, R, and B signals from the buffer memories 331, 332, and 333 to the lines 61, 62, and 63 and direct the G signal from the buffer memory 331 to the line 64 as well.

Then, in a case where a full-color image is outputted, in the same way as the case where the input color signals are the Lab signals, as shown in FIG. 11, the RGB signals obtained repeatedly on the lines 61 to 63 after being repeatedly read from the buffer memories 331 to 333 are converted into CoMoYoKo signals in a frame-sequential manner in the order of, for instance, Ko, Co, Mo, and Yo signals, thereby outputting a CMYK full-color image by the image output device 350. The gradation correction characteristic of the one-dimensional LUT 23 is also set in the same way as the case where the input color signals are the Lab signals.

Also in the case where a monochrome image is outputted, in the same way as the case where the input color signals are the Lab signals, the G signals obtained on the line 64 are subjected to gradation conversion by the one-dimensional LUT 23, and G" signals subjected to gradation conversion by the one-dimensional LUT 23 are supplied to the image output device 350, thereby outputting a monochrome image by the image output device 350. The gradation conversion characteristic of the one-dimensional LUT 23 is also set in the same way as the case where the input color signals are the Lab signals.

Although, in FIG. 8, only the Lab signals and the RGB signals are shown as input color signals consisting of three signals, such input color signals as XYZ signals and YCbCr signals can also be converted into the CoMoYoKo signals in a similar manner so as to output a CMYK full-color image. Also, a monochrome image of the C, M, Y, or K plate can be outputted by means of the lightness signal or the signal most containing the lightness information among the input color signals.

In accordance with the above-described embodiment shown in FIG. 9, the CiMiYiKi signals which are particular CMYK signals can be converted into the CoMoYoKo signals which are other CMYK signals by the simple converting means comprising one three-dimensional LUT color converting device 19 and four one-dimensional LUTs 71 to 73 and 23. In addition, such color signals as the Lab signals and the RGB signals can also be converted into the CoMoYoKo signals by the same converting means so as to output a CMYK full-color image. Further, a monochrome image of the C, M, Y, or K plate can be outputted by means of color signals such as the Lab signals and the RGB signals.

Figure 12:
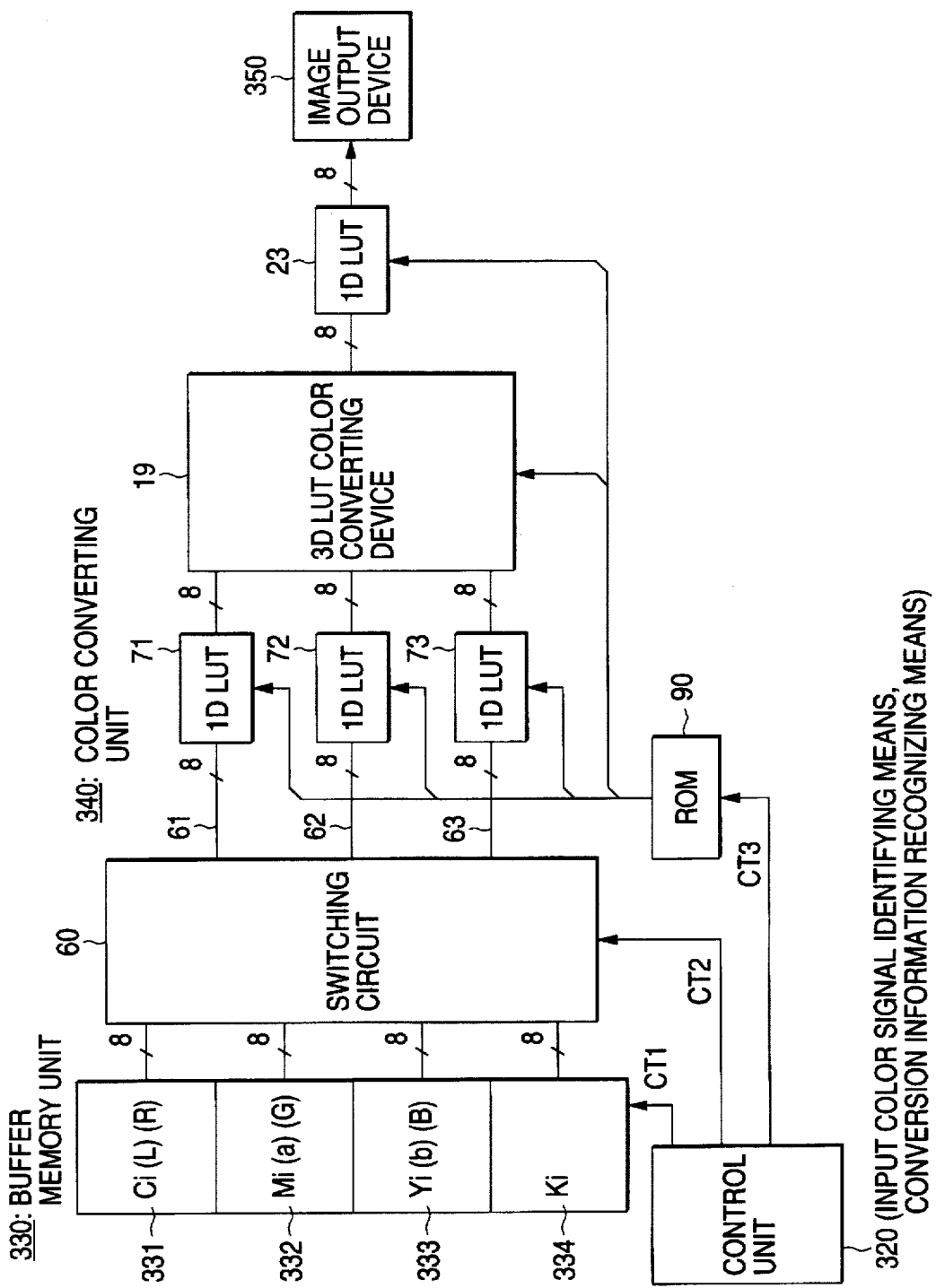
FIG. 12 is a block diagram showing an image processing apparatus according to still another embodiment of the invention which is used in the system of FIG. 8.

FIG. 12 shows an image processing apparatus according to a further embodiment of the invention which apparatus is used in the image output system shown in FIG. 8. The color converting unit 340 in this embodiment is arranged such that the switching circuit 60 assigns and transmits the signals read from the buffer memories 331 to 334 to the three output lines 61 to 63 by means of the control signal CT2. In this example, the selector 80 shown in FIG. 9 is not provided, and the output from the three-dimensional LUT color converting device 19 is inputted directly to the one-dimensional LUT 23. Accordingly, the control signal CT4 in the embodiment shown in FIG. 9 is not required in this embodiment.

Figure 13:
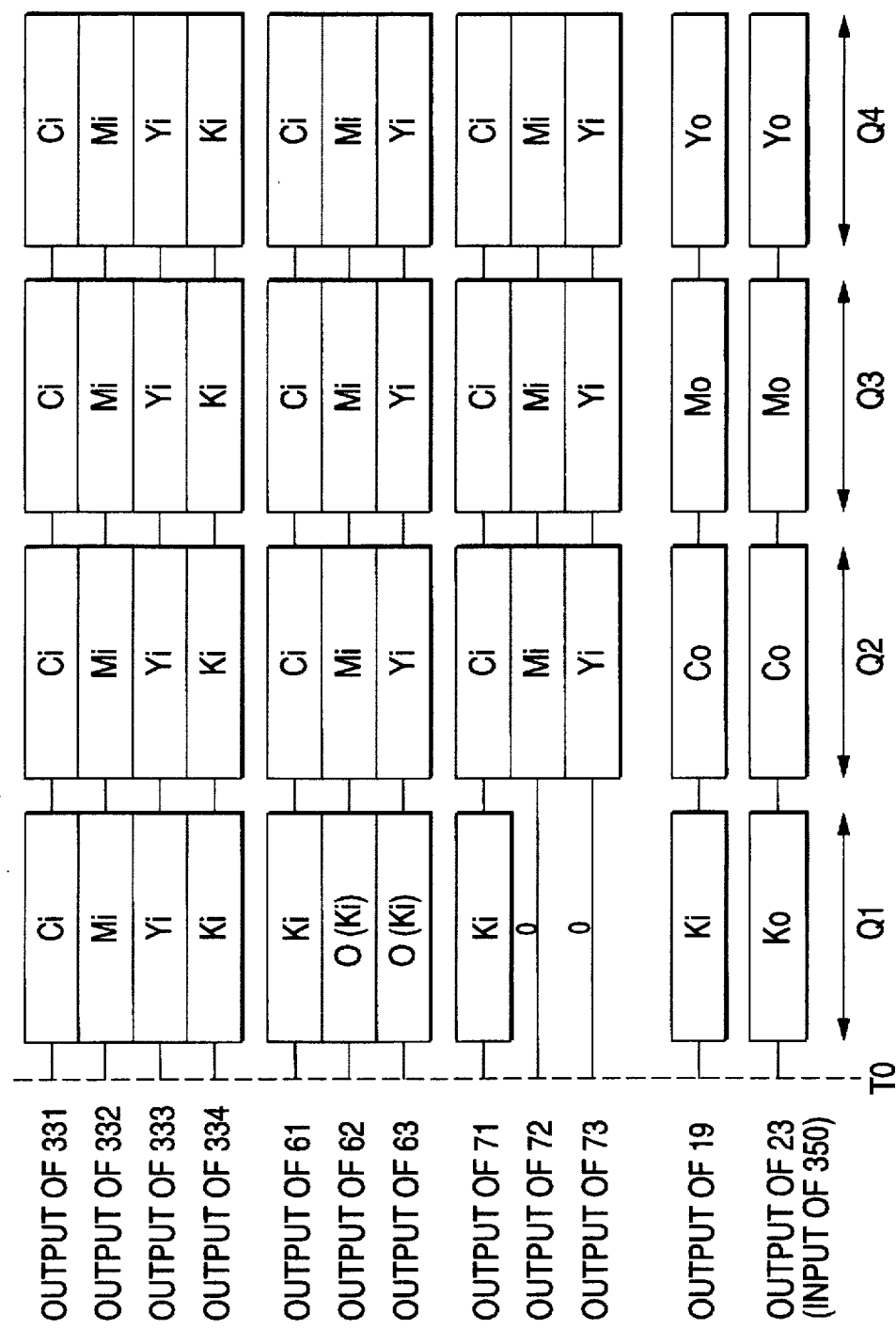
FIG. 13 is a timing chart showing the operation the image processing apparatus of FIG. 12.
Figure 15:
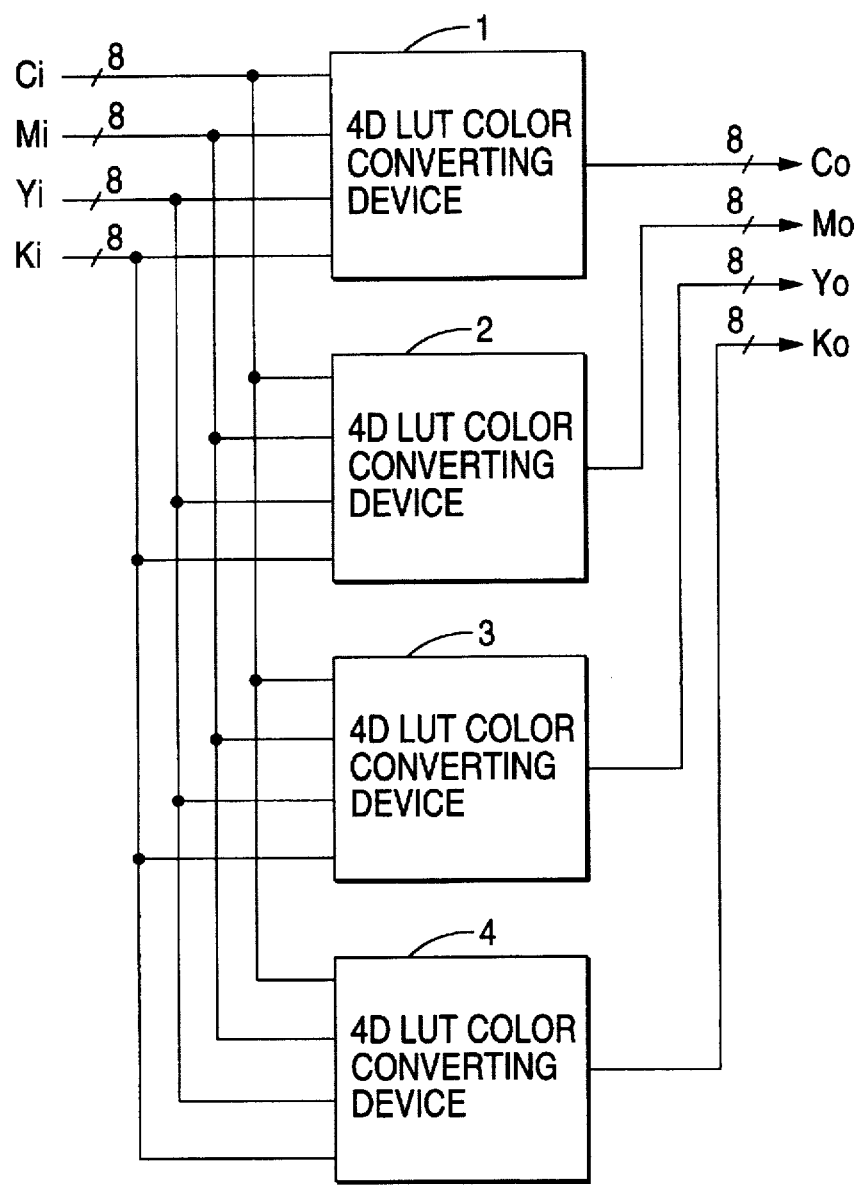
FIG. 15 is a block diagram showing an example of a conceivable image processing apparatus to be used for converting particular CMYK signals into other CMYK signals.

In a case where CiMiYiKi signals, which are particular CMYK signals from the printing scanners 212, 222 or the external storage medium 243 shown in FIG. 8, are transmitted to the printer 300 as input color signals, a one-page portion of Ci, Mi, Yi, and Ki signals are stored in advance in the buffer memories 331, 332, 333, and 334 until the timing T0, as shown in FIG. 13, in the same way as in the embodiment of FIG. 9. Then, during the periods Q1, Q2, Q3, and Q4 subsequent to the timing T0, a one-page portion of CiMiYiKi signals is repeatedly read from the buffer memories 331 to 334.

In this case, if it is assumed that the printing by the image output device 350 is effected in the order of K, C, M, and Y, a conversion table having the characteristic of using input values directly as output values, as shown in FIG. 4, is set in a one-dimensional LUT 71 from the ROM 90 by means of the control signal CT3 immediately after the timing T0. Meanwhile, conversion tables for setting the respective output values to zeros irrespective of input values are set in the one-dimensional LUTs 72 and 73. Further, a conversion table for setting the input values only with respect to the axial direction of the signals from the one-dimensional LUT 71 directly as output values is set in the three-dimensional LUT color converting device 19. Furthermore, a conversion table for subjecting the Ki signals to gradation conversion into Ko signals for the image output device 350 is set in the one-dimensional LUT 23.

As shown in FIG. 13, the switching circuit 60 is changed over in such a manner as to direct the Ki signals from the buffer memory 334 to the line 61 during the period Q1 by means of the control signal CT2. Outputs from the lines 62 and 63 are forcibly set at zeros, respectively, or the Ki signals are also directed from the buffer memory 334 to the lines 62 and 63 in an overlapping manner. Alternatively, the Ci, Mi, or Yi signals from the buffer memories 331, 332 or 333 are directed thereto as a dummy.

Accordingly, during the period Q1, the Ki signals on the line 61 are inputted to the one-dimensional LUT 23 without being substantially converted by the one-dimensional LUT 71 and the three-dimensional LUT color converting device 19, and are subjected to gradation conversion into Ko signals by the one-dimensional LUT 23. Thus, the Ko signals are outputted from the one-dimensional LUT 23 to the image output device 350.

After the period Q1, the operation is the same as that for the embodiment shown in FIG. 9. That is, immediately before the period Q2, a conversion table having the input/output characteristic of using input values directly as output values, as shown in FIG. 4, is set in the one-dimensional LUTs 71 to 73 and 23 from the ROM 90. At the same time, a conversion table for converting the CiMiYi signals into Co signals for the image output device 350 is set in the three-dimensional LUT color converting device 19.

Accordingly, during the period Q2, the CiMiYi signals on the lines 61 to 63 are inputted from the one-dimensional LUTs 71 to 73 to the three-dimensional LUT color converting device 19 without being substantially converted, and are converted into the Co signals by the three-dimensional LUT color converting device 19. The Co signals are outputted from the one-dimensional LUT 23 to the image output device 350 without being substantially converted.

Immediately before the period Q3, a conversion table for converting the CiMiYi signals into Mo signals for the image output device 350 are set in the three-dimensional LUT color converting device 19 from the ROM 90. Hence, during the period Q3, the CiMiYi signals are converted into the Mo signals by the three-dimensional LUT color converting device 19, and the Mo signals are outputted from the one-dimensional LUT 23 to the image output device 350.

Similarly, immediately before the period Q4, a conversion table for converting the CiMiYi signals into Yo signals for the image output device 350 is set in the three-dimensional LUT color converting device 19. During the period Q4, the CiMiYi signals are converted into the Yo signals by the three-dimensional LUT color converting device 19, and the Yo signals are outputted from the one-dimensional LUT 23 to the image output device 350.

In a case where the Lab signals from the external storage medium 253 or the RGB signals from the color scanner 232 are transmitted to the printer 300 as input color signals (see FIG. 8), a one-page portion of the L, a, and b signals or the R, G, and B signals is stored in the buffer memories 331, 332, and 333, and the switching circuit 60 is changed over in such a manner as to direct the L, a, and b signals or the R, G, and B signals from the buffer memories 331, 332, and 333 to the lines 61, 62, and 63.

Meanwhile, in a case where a full-color image is outputted, in the same way as in the embodiment shown in FIG. 9, during the periods Q1 to Q4, a one-page portion of the Lab signals or RGB signals is repeatedly read from the buffer memories 331 to 333, and conversion tables similar to those of the embodiment shown in FIG. 9 are set in the one-dimensional LUTs 71 to 73 and 23 from the ROM 90. Hence, as is apparent if it is considered that the output from the line 64 and the output from the selector 80 are omitted in FIG. 11 that relates to the embodiment shown in FIG. 9, in the same way as in the embodiment shown in FIG. 9, the Lab signals or the RGB signals are converted into the CoMoYoKo signals in a frame-sequential manner, and a CMYK full-color image is outputted by the image output device 350.

Also in a case where a monochrome image is outputted, the L signals from the buffer memory 331 if, for example, the input color images are the Lab signals, and the G signals from the buffer memory 332 if the input color signals are the RGB signals, are respectively directed to the line 61. In addition, the outputs from the lines 62 and 63 are forcibly set at zeros, respectively, and conversion tables similar to those set immediately before the period Q1 in the case of outputting a full-color image is set in advance in the one-dimensional LUTs 71 to 73 and the three-dimensional LUT color converting device 19 from the ROM 90. Also, a conversion table similar to that set immediately before the period Q1 in the case of outputting a monochrome image in the embodiment shown in FIG. 9 is set in advance in the one-dimensional LUT 23. Thus, in the same way as the embodiment shown in FIG. 9, a monochrome image of the K, C, M, or Y plate is outputted from the image output device 350.

In the embodiment shown in FIG. 12 as well, it is possible to obtain advantages similar to those of the embodiment shown in FIG. 9. However, if a further comparison is made between the two embodiments, the embodiment in FIG. 9 has the advantage of shortening the processing time since wasteful reference to the conversion tables and interpolation calculation in the one-dimensional LUTs 71 to 73 and the three-dimensional LUT color converting device 19 are eliminated with respect to the gradation conversion of the Ki signals in the conversion from the CiMiYiKi signals into the CoMoYoKo signals and the gradation conversion of the L signals and the G signals in outputting a monochrome image from input color signals such as the Lab signals and the RGB signals.

In contrast, the embodiment shown in FIG. 12 has the advantage that the circuit configuration can be made simple since the operation of selecting signals by the selector 80 in the embodiment in FIG. 9 is omitted, and conversion can be effected merely by the setting of conversion tables in the one-dimensional LUTs 71 to 73 and 23 and the three-dimensional LUT color converting device 19 from the ROM 90 except for the assigning of signals by the switching circuit 60.

It should be noted that, if only the case of converting the CiMiYiKi signals into the CoMoYoKo signals is considered, the embodiments in FIGS. 9 and 12 may be arranged such that the signals on the lines 61 to 63 are directly inputted to the three-dimensional LUT color converting device 19.

In that case, in the embodiment shown in FIG. 12, it suffices if the following settings are provided. That is, during the period in which the Ki signals are converted into the Ko signals as during the period Q1 shown in FIG. 13, the Ki signals from the buffer memory 334 are directed to the line 61, and the outputs from the lines 62 and 63 are forcibly set at zeros, respectively. Immediately before then, a conversion table for using input values directly as output values only with respect to the axial direction of the signals on the line 61 is set in the three-dimensional LUT color converting device 19. Alternatively, during the period during which the Ki signals are converted into the Ko signals, the Ki signals from the buffer memory 334 are directed to all of the lines 61 to 63, and immediately before then a conversion table for using input values directly as output values with respect to all the axial directions is set in the three-dimensional LUT color converting device 19 immediately before then.

Also in the embodiments shown in FIGS. 9 and 12, the buffer memory unit 330 is merely an example of a means which is capable of repeating the input color signals. The buffer memory unit 330 is not necessarily required if consideration is given to only those input color signals which are stored in an external storage medium, and in a case where the input color signals can be repeatedly obtained from the external storage medium.

As described above, in accordance with the present invention, particular CMYK signals can be converted into other CMYK signals with a simple configuration equivalent to that in the case adapted for three inputs in terms of the table size and the interpolation configuration of the color converting means of the conversion-table referencing type, and with high accuracy equivalent to that in the case adapted for four inputs in terms of the conversion accuracy.

What is claimed is:

1. An image processing apparatus for converting Ci, Mi, Yi and Ki color component signals that are first cyan, magenta, yellow, and black color component signals into Co, Mo, Yo, and Ko color component signals that are second cyan, magenta, yellow, and black color component signals, comprising:

CMY-signal converting means for converting the Ci, Mi and Yi color component signals into the Co, Mo and Yo color component signals by using a color converting device of a three-dimensional-conversion-table referencing type for each color component; and K-signal converting means for subjecting the Ki color component signal to gradation conversion to obtain the Ko color component signal.

2. The image processing apparatus according to claim 1, wherein the CMY-signal converting means includes only one color converting device of a three-dimensional-conversion-table referencing type, and wherein a conversion table of the only one color converting device of a three-dimensional-conversion-table referencing type is changed in a frame-sequential manner, and the Co, Mo and Yo signals are obtained from the only one color converting device of a three-dimensional-conversion-table referencing type in a frame-sequential manner.

3. An image processing apparatus for converting Ci, Mi, Yi and Ki color component signals that are first cyan, magenta, yellow and black color component signals into Co, Mo, Yo and Ko color component signals that are second cyan, magenta, yellow and black color component signals, comprising:

CMY-signal converting means for converting the Ci, Mi and Yi color component signals into the Co, Mo and Yo color component signals by using a color converting device of a three-dimensional-conversion-table referencing type for each color component; and K-signal non-converting output means for outputting the Ki color component signal as the Ko color component signal without converting the Ki signal.

4. An image processing apparatus for converting plural kinds of input color component signals, each kind consisting of three or four color component signals, including Ci, Mi, Yi and Ki color component signals that are first cyan, magenta, yellow, and black color component signals into Co, Mo, Yo and Ko color component signals that are second cyan, magenta, yellow, and black color component signals, comprising:

input-color-signal identifying means for identifying a kind of actually inputted color signals on the basis of information added to the actually inputted color signals;

signal converting means for converting three color component signals of the actually inputted color signals, excluding the Ki color component signal when the actually inputted color component signals are the Ci, Mi, Yi and Ki color component signals, into the Co, Mo and Yo color component signals or the Co, Mo, Yo and Ko color component signals by using a color converting device of a three-dimensional-conversion-table referencing type for each color component;

signal output means for subjecting one of the actually inputted color signals to gradation conversion to obtain the Ko color component signal, or outputting the one of the actually inputted color component signals as the Ko color component signal without converting the one of the actually inputted color signals, the one of the actually inputted color signals being the Ki color component signal when the input color component signals are the Ci, Mi, Yi and Ki color component signals; and selecting means for selecting, on the basis of the kind of the actually inputted color image signals identified by the input-color-signal identifying means, both of the signal converting means and the signal output means when the actually inputted color signals are the Ci, Mi, Yi and Ki color component signals, and only the signal converting means when the actually inputted color signals are not the Ci, Mi, Yi and Ki color component signals.

5. An image processing apparatus for converting Ci, Mi, Yi and Ki color component signals that are first cyan, magenta, yellow, and black color component signals that are generated by color signal generating means connected to a network, into Co, Mo, Yo and Ko color component signals that are second cyan, magenta, yellow, and black color component signals, comprising:

color signal input means for receiving the Ci, Mi, Yi and Ki color component signals from the color signal generating means;

conversion information recognizing means for recognizing information to be used in converting the Ci, Mi, Yi and Ki color component signals with mapping to a physical color space;

CMY-signal converting means for converting the Ci, Mi and Yi color component signals that are supplied from the color signal input means into the Co, Mo and Yo color component signals by using a color converting device of a three-dimensional-conversion-table referencing type for each color component;

conversion table setting means for setting a conversion table of the CMY-signal converting means on the basis of a recognition result of the conversion information recognizing means; and signal output means for subjecting the Ki color component signal that is supplied from the color signal input means to gradation conversion to obtain the Ko color component signal, or outputting the Ki color component signal as the Ko color component signal without converting the Ki color component signal.

6. An image processing apparatus for converting Ci, Mi, Yi and Ki color component signals that are first cyan, magenta, yellow, and black color component signals stored in an external storage medium, into Co, Mo, Yo and Ko color component signals that are second cyan, magenta, yellow, and black color component signals, comprising:

color signal input means for receiving the Ci, Mi, Yi and Ki color component signals from the external storage medium;

conversion information recognizing means for recognizing information to be used in converting the CiMiYiKi color component signals with mapping to a physical color space;

CMY-signal converting means for converting the Ci, Mi and Yi color component signals that are supplied from the color signal input means into the Co, Mo and Yo color component signals by using a color converting device of a three-dimensional-conversion-table referencing type for each color component;

conversion table setting means for setting a conversion table of the CMY-signal converting means as on the basis of a recognition result of the conversion information recognizing means; and signal output means by subjecting the Ki color component signal that is supplied from the color-signal input means to gradation conversion to obtain the Ko color component signal, or outputting the Ki color component signal as the Ko color component signal without converting the Ki color component signal.

7. A color conversion processing method for converting Ci, Mi, Yi and Ki color component signals that are first cyan, magenta, yellow, and black color component signals into Co, Mo, Yo and Ko color component signals that are second cyan, magenta, yellow, and black color component signals, comprising the steps of:

converting the Ci, Mi and Yi color component signals into the Co, Mo and Yo color component signals by using a color converting device of a three-dimensional-conversion-table referencing type for each color component; and subjecting the Ki color component signal to gradation conversion to obtain the Ko color component signal.

8. A color conversion processing method for converting Ci, Mi, Yi and Ki color component signals that are first cyan, magenta, yellow, and black color component signals into Co, Mo, Yo and Ko color component signals that are second cyan, magenta, yellow, and black color component signals, comprising the steps of:

converting the Ci, Mi and Yi color component signals into the Co, Mo and Yo color component signals by using a color converting device of the three-dimensional-conversion-table referencing type for each color component; and outputting the Ki color component signal as the Ko color component signal without converting the Ki color component signal.

* * * * *